US012730981B1

(12) United States Patent
Pertsel

(10) Patent No.: US 12,730,981 B1
(45) Date of Patent: Sep. 8, 2026

(54) INTELLIGENT NOTIFICATIONS FOR TRUCK BED CAMERA ENABLED BY SMART METADATA USING IMAGE TO TEXT MODELS

(71) Applicant: Ambarella International LP, Santa Clara, CA (US)

(72) Inventor: Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 33 days.

(21) Appl. No.: 18/583,298

(22) Filed: Feb. 21, 2024

(51) Int. Cl.

| | |
|---|---|
| ***G06F 40/40*** | (2020.01) |
| ***G06T 7/70*** | (2017.01) |
| ***G06V 10/80*** | (2022.01) |
| ***G06V 10/94*** | (2022.01) |
| ***G06V 20/40*** | (2022.01) |
| ***G06V 20/58*** | (2022.01) |
| ***G06V 20/70*** | (2022.01) |
| ***G06V 40/16*** | (2022.01) |
| ***H04N 7/18*** | (2006.01) |
| *B60Q 9/00* | (2006.01) |

(52) U.S. Cl.
CPC ................ *G06F 40/40* (2020.01); *G06T 7/70* (2017.01); *G06V 10/803* (2022.01); *G06V 10/95* (2022.01); *G06V 20/41* (2022.01); *G06V 20/58* (2022.01); *G06V 20/70* (2022.01); *G06V 40/172* (2022.01); *H04N 7/183* (2013.01); *B60Q 9/00* (2013.01); *G06T 2207/30261* (2013.01)

(58) Field of Classification Search
None
See application file for complete search history.

(56) References Cited

U.S. PATENT DOCUMENTS

| | | | | | |
|---|---|---|---|---|---|
| 10,854,055 | B1 * | 12/2020 | Cornell | G08B 29/186 | |
| 2012/0245969 | A1 * | 9/2012 | Campbell | G06Q 10/087 | 705/7.11 |
| 2012/0263450 | A1 * | 10/2012 | Totani | B60R 11/04 | 396/428 |
| 2014/0152422 | A1 * | 6/2014 | Breed | B60R 25/08 | 340/5.52 |
| 2015/0054950 | A1 * | 2/2015 | Van Wiemeersch | B60R 21/01 | 382/104 |
| 2016/0371632 | A1 * | 12/2016 | Lorenzini | G06V 20/63 | |
| 2019/0303850 | A1 * | 10/2019 | Mangos | G06Q 10/087 | |
| 2021/0287013 | A1 * | 9/2021 | Carter | H04N 7/181 | |

(Continued)

*Primary Examiner* — Hung Q Dang

(74) *Attorney, Agent, or Firm* — Maiorana Patent Law, PA

(57) ABSTRACT

An apparatus comprising an interface and a processor. The interface may be configured to receive pixel data of an environment near a vehicle. The processor may be configured to process the pixel data arranged as video frames, perform computer vision operations on the video frames to detect objects, store an inventory of items in response to generating a text description of each of the objects, determine criteria for a notification rule for the objects of the inventory of items in response to a user input, determine whether the criteria for the notification rule for the objects has been met, and generate a notification according to the notification rule in response to detecting that the criteria has been met. The processor may comprise an AI module configured to perform video to text analysis of the video frames to generate the text description and determine the notification rule.

20 Claims, 18 Drawing Sheets

(56) References Cited

U.S. PATENT DOCUMENTS

| | | | | |
|---|---|---|---|---|
| 2023/0342718 | A1* | 10/2023 | Yasuda | G06Q 10/087 |
| 2024/0071014 | A1* | 2/2024 | Jonker | G06T 19/006 |
| 2024/0124007 | A1* | 4/2024 | Hawley | G06T 7/70 |
| 2025/0069400 | A1* | 2/2025 | Kelly | G06T 7/73 |

* cited by examiner

INTELLIGENT NOTIFICATIONS FOR TRUCK BED CAMERA ENABLED BY SMART METADATA USING IMAGE TO TEXT MODELS

FIELD OF THE INVENTION

The invention relates to computer vision generally and, more particularly, to a method and/or apparatus for implementing intelligent notifications for a truck bed camera enabled by smart metadata using image to text models.

BACKGROUND

In North America pickup trucks are the most popular vehicle class. Estimates have pickup trucks at nearly 20% of the market. Some pickup truck users use the truck bed to store a wide variety of items. Pickup truck drivers that use the vehicle for work often store tools, which can be expensive, in the truck bed for long term storage. Some pickup truck drivers accumulate a large amount of contents in the truck bed that can be difficult to keep track of. The accumulation of items and the movement of the vehicle can result in various items being lost.

The open design of truck beds can make pickup trucks an easy target for theft. Careless owners might not tie down loose items, resulting in items flying out of the truck bed during transport. A malfunctioning latch can result in items accidentally sliding out of an open truck bed. Pickup trucks are often used for tailgate parties, which can involve a large number of unknown people approaching the vehicle, which is another opportunity for theft. Users of pickup trucks do not have a convenient option for ensuring that items are not lost or taken from the truck bed.

It would be desirable to implement intelligent notifications for a truck bed camera enabled by smart metadata using image to text models.

SUMMARY

The invention concerns an apparatus comprising an interface and a processor. The interface may be configured to receive pixel data of an environment near a vehicle. The processor may be configured to process the pixel data arranged as video frames, perform computer vision operations on the video frames to detect objects in the environment, store an inventory of items in response to generating a text description of each of the objects in the environment, determine criteria for a notification rule for one of the objects of the inventory of items in response to a user input, perform the computer vision operations on the video frames to determine whether the criteria for the notification rule for the one of the objects has been met, and generate a notification according to the notification rule in response to detecting that the criteria has been met. The processor may comprise an AI module configured to perform video to text analysis of the video frames to generate the text description of the objects in the environment and determine the notification rule in response to the user input.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
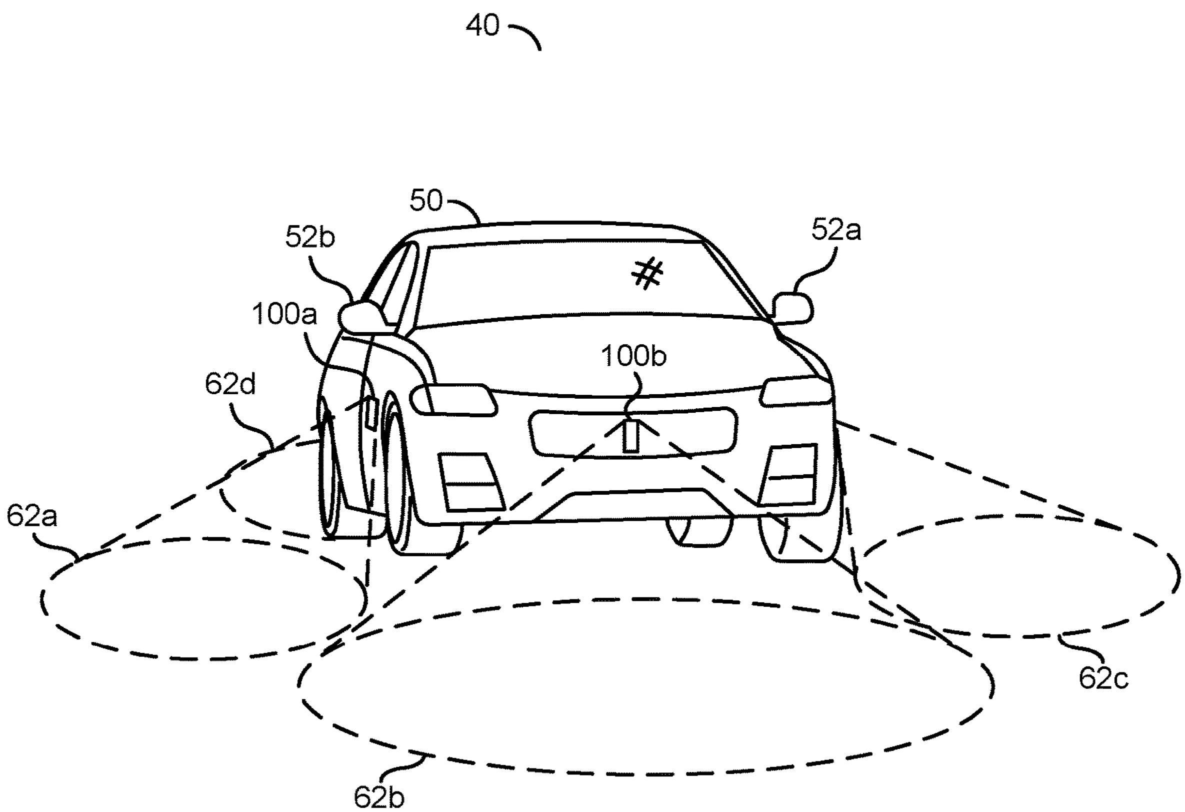
FIG. 1 is a diagram illustrating an example embodiment of the present invention configured to provide an all-around view of a vehicle.

Embodiments of the present invention include providing intelligent notifications for a truck bed camera enabled by smart metadata using image to text models that may (i) implement video-to-text analysis, (ii) determine an inventory of items from video analysis, (iii) provide a natural language video search, (iv) implement one or more AI models locally on an edge device, (v) upload video data to cloud services and access results from AI models implemented in the cloud services, (vi) generate smart metadata that provides a full description and location of items in captured video, (vii) send notifications based on notification rules, (viii) distinguish between people approaching a vehicle and/or (ix) be implemented as one or more integrated circuits.

Embodiments of the present invention may be configured to provide notifications, generate text descriptions of objects and/or store an inventory of items near and/or in a vehicle. The video data that may be searched and/or analyzed may be generated by vehicle cameras integrated into the vehicle (e.g., a backup camera) and/or after market cameras installed on a vehicle (e.g., a dashcam, a security camera, a truck bed monitoring camera, etc.). The video data analyzed may be generated while the vehicle is idle (e.g., parked) and/or in motion (e.g., while driving). The type of camera implemented to monitor an environment near the vehicle may be varied according to the design criteria of a particular implementation.

Embodiments of the present invention may be configured to process pixel data arranged as video frames and perform computer vision operations on the video frames. Smart metadata may be generated in response to objects in the environment detected using the computer vision operations. Using the smart metadata, an inventory of items may be stored. The inventory of items may be stored in response to generating a text description of each of the objects detected in the environment. The smart metadata may be generated using image to text artificial intelligence (AI) models. In some embodiments, the image to text AI models may be implemented on an edge device (e.g., implemented by a processor of the vehicle camera). In some embodiments, the image to text AI models may be implemented by cloud computing services (e.g., video data may be uploaded to a computing service that may offer computational services based on demand and/or usage to generate the smart metadata and the smart metadata may be communicated back to the edge device). The implementation of the one or more AI models implemented may be varied according to the design criteria of a particular implementation.

In some embodiments, the video frames generated may be continuously and/or continually analyzed using a video to text AI model. In some embodiments, the analysis of the video to text AI model may be limited to video frames that correspond to an event being detected (e.g., detecting motion, detecting audio, detecting a particular type of object, detecting a person, etc.). The video to text AI model may be configured to generate natural language text based on patterns and/or relationships between words in a particular language (e.g., a spoken language). In one example, the AI model may implement a Large Language Model (LLM). The video to text AI model may be configured to generate a text description of the objects in the image and/or several key images from the video. The text description may be stored as metadata alongside the video data at a corresponding time code (e.g., timestamp). The text description may comprise more than keywords. In an example, the text description may comprise a plain language description of the contents of each video frame. The text description may provide a thorough explanation of objects, features and/or context of the contents of the captured video. In one example, a keyword description may provide basic elements of the video (e.g., a person, dog, street, darkness, etc.) while the text description may comprise context (e.g., a person walking their dog outside on a city street at night time). In another example, the text description may comprise details about a type, behavior and/or location of an object (e.g., a hammer located on a right side near the back of a truck bed). The text description may be human readable text and/or generated to fully describe the image as if written by a human. The type of description and/or the level of detail used for the text description generated by the video to text AI model may be varied according to the design criteria of a particular implementation.

Embodiments of the present invention may be configured to determine criteria for a notification rule for one or more of the objects in the inventory of items. For example, a user may be presented with the inventory of items (e.g., using an app) and the user may provide user input that describes the criteria for a notification rule. The criteria for the notification rule may be a plain language description. In one example, the criteria may be "notify me when a person is reaching for my tools". In yet another example, the criteria may be "notify me if my hockey bag is sliding out of my truck". In another example, the criteria may be "let my friends take a beer from the cooler in my truck, but notify me if someone else takes a beer". The type of criteria for a notification rule may be varied according to the design criteria of a particular implementation.

Embodiments of the present invention may be configured to perform computer vision on the video frames to determine whether the criteria for the notification rule for one or more of the objects has been met and/or to generate a notification according to the notification rule when the criteria has been met. The criteria for the notification rule may be implemented in order to limit and/or reduce a number of false positive notifications that may be generated in response to detecting particular types of events (e.g., motion, audio, objects that do not belong to the owner, facial recognition, etc.). The analysis for the notification rule may be configured to classify an importance and/or urgency of the content of the video data based on the inventory of items. In one example, detecting an item sliding around in a truck bed may be an event that has been detected, but may not be an event that the user wants to be notified about. In another example, a thief reaching into a truck bed may be an event and meet the criteria of a notification rule. In yet another example, a person sitting near the vehicle for a tailgate party may be an event but may not meet the criteria for a notification rule. Events may be detected using object/behavior recognition and may be noted and/or flagged, but may not necessarily be criteria for one of the notification rules. If an event is determined to meet the criteria for a notification rule, then a notification may be generated.

An AI model may be configured to determine the notification rule and/or compare the criteria for the notification rule with results of the computer vision operations. In one example, the notification rule AI model may be a neural network (NN). For example, the notification rule AI model may be a convolutional neural network. The notification rule AI model may be trained to determine whether various events detected meet the criteria of the notification rule. In one example, the user may provide a human, plain language description of the criteria. In some embodiments, the notification rule AI model may suggest notification rules for objects in response to being trained in response to learning particular descriptions, events and/or keywords that particular users tend to request notifications for (e.g., interact with, engage with, etc.). For example, detecting an object sliding around the truck bed may not be considered an important event. However, if a user repeatedly sets notification rules for particular types of objects (e.g., tools), then the notification rule AI model may be trained to suggest a notification rule for particular categories of objects. In some embodiments, the training of the notification rule AI model may be personalized and/or individualized. For example, an AI model trained for one user (e.g., a carpenter) may learn that detection of circumstances related to wood supplies may be urgent, while an AI model trained for another user (e.g., someone carrying scrap wood) may learn that detection of wood boards may not be considered urgent. The AI model may be trained for multiple different users, each having a distinct profile. The AI model may be trained for different types of objects. The particular events that may be learned by the notification rule AI model may be varied according to the design criteria of a particular implementation.

Embodiments of the present invention may be configured to enable an item inventory interface. The item inventory interface may provide a user with a list of items and/or a description of each of the items detected. In some embodiments, the inventory of items may be used internally by the processor and/or AI models to distinguish and/or track the location of various objects detected. In some embodiments, the inventory of items may be provided with an interface to enable the user to select a particular object (or objects) to create notification rules.

Embodiments of the present invention may be configured to enable a notification rule interface. The notification rule interface may enable a user to set the criteria for generating a notification for the objects using a natural language interface. The natural language interface may enable a user to provide criteria for the notification rules using plain language. The natural language interface may be configured to process the inventory of items to determine which items to apply the notification rules to and/or how to interpret the criteria when analyzing the video frames. The natural language interface may be configured to provide notification rules based for particular items and/or a context of the criteria provided.

The natural language interface may be implemented using an AI model. The notification rule AI model may be configured to parse the user input and/or compare the context and/or topic of the notification rule with the text description of the smart metadata and/or the text description of the inventory of items. The notification rule AI model may be configured to perform natural language processing and/or determine an item associated with the rule based on the patterns and/or relationships between the words of the rule. In one example, the notification rule AI model may be an LLM (e.g., Gemini, ChatGPT, etc.). The natural language interface may enable the user to provide an input (e.g., "let me know when someone approaches the truck bed", "where is my hammer?", "let Alice and Bob take food from my cooler but not anyone else", etc.). In an example, the notification rule AI model may be configured to determine the particular items (e.g., 'someone' refers to a person, 'hammer' refers to the inventory item, 'food' and 'cooler' refers to the inventory item, etc.).

A notification may be generated in response to the computer vision operations. Smart metadata may be generated in response to analyzing the video frames. The smart metadata may describe the contents of the video frames. The smart metadata may be compared to the criteria for the notification rules. Notifications may be sent when the criteria for the notification rules is met. Sending a notification depending on the notification rules may ensure desired notifications are received and/or limit false positives. The notification may comprise the natural language text description of the video frames. The natural language text description in the notification may enable the user to quickly read about the contents of the video. Reading the contents of the video may enable bandwidth savings (e.g., the user may understand what happens in the video without downloading the video frames). Reading the contents of the video may enable the user to determine whether to understand the video faster through reading rather than taking the time to watch the video frames. The user may later decide to watch the video (e.g., when more privacy is available, when the user has more time, if the user decides that the video is worth watching, etc.).

Referring to FIG. 1, a diagram illustrating an example embodiment of the present invention configured to provide an all-around view of a vehicle is shown. An external view 40 for a vehicle 50 is shown. External side view mirrors 52*a*-52*b* are shown. The side view mirror 52*a* may be a side view mirror on the driver side of the vehicle 50. The side view mirror 52*b* may be a side view mirror on the passenger side of the vehicle 50. The vehicle 50 may comprise devices 100*a*-100*n*. The devices 100*a*-100*n* may be camera systems. Camera systems 100*a*-100*b* are shown integrated as part of the vehicle 50. The camera system 100*a* is shown on a passenger side of the vehicle 50. The camera system 100*a* is shown below the passenger side view mirror 52*b*. The camera system 100*b* is shown on the front grille of the vehicle 50. In the perspective of the vehicle 50 shown, two of the camera systems 100*a*-100*b* may be visible. However, one of the camera systems 100*a*-100*n* may be implemented at a level below the driver side view mirror 52*a* (not visible from the perspective of the external view 40 shown). Other camera systems 100*a*-100*n* may be located throughout the exterior of the vehicle 50. The camera systems 100*a*-100*n* may be configured to capture an all-around view of the environment 40 near the vehicle 50.

Dashed lines 62*a*-62*d* are shown. In the example shown, the dashed lines 62*a* are shown extending from the camera system 100*a* and the dashed lines 62*b* are shown extending from the camera system 100*b*. The dashed lines 62*c*-62*d* may similarly extend from respective camera systems 100*c*-100*d* (not visible from the perspective shown). The dashed lines 62*a*-62*d* may provide an illustrative representation of fields of view captured by each of the camera systems 100*a*-100*d*. The fields of view 62*a*-62*d* together may provide an all-around view of the environment near the vehicle 50.

The all-around view 62*a*-62*d* is shown. In an example, the all-around view 62*a*-62*d* may enable an all-around view (AVM) system. The AVM system may comprise four cameras (e.g., each camera may comprise a combination of one of the camera systems 100*a*-100*n* and/or a stereo pair of the lenses implemented by the camera systems 100*a*-100*n*). In the perspective shown in the external view 40, the camera system 100*a* and the camera system 100*b* may each be one of the four cameras and the other two cameras may not be visible. In an example, the camera system 100*b* may be a camera located on the front grille of the vehicle 50, one of the cameras may be on the rear (e.g., over the license plate), the camera system 100*a* may be located below the side view mirror 52*b* on the passenger side and one of the cameras may be located below the side view mirror 52*a* on the driver side. The arrangement of the cameras may be varied according to the design criteria of a particular implementation.

In some embodiments, each of the camera systems 100*a*-100*d* may be configured to capture pixel data arranged as video frames. In some embodiments, each of the camera systems 100*a*-100*d* providing the all-around view 62*a*-62*d* may implement a fisheye lens (e.g., may capture a video frame with a 180 degrees angular aperture). The all-around view 62*a*-62*d* is shown providing a field of view coverage all around the vehicle 50. For example, the portion of the all-around view 62*a* may provide coverage for a passenger side of the vehicle 50, the portion of the all-around view 62*b* may provide coverage for a front of the vehicle 50, the portion of the all-around view 62*c* may provide coverage for a driver side of the vehicle 50 and the portion of the all-around view 62*d* may provide coverage for a rear of the vehicle 50. Each portion of the all-around view 62*a*-62*d* may be one field of view of a camera mounted to the vehicle 50. Each portion of the all-around view 62*a*-62*d* may be dewarped and stitched together by the video processors to provide an enhanced video frame that represents a top-down view near the vehicle 50. In an example, the all-around view 62*a*-62*d* may be used to provide a representation of a bird's-eye view of the vehicle 50.

The camera systems 100*a*-100*d* may provide a representative example of the mechanism for image acquisition. In one example, the camera systems 100*a*-100*d* may be implemented as monocular cameras. In another example, the camera systems 100*a*-100*d* may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the vehicle 50. The locations of the camera systems 100*a*-100*d* on the vehicle 50 and/or the orientation of the camera systems 100*a*-100*d* may be varied according to the design criteria of a particular implementation.

Figure 2:
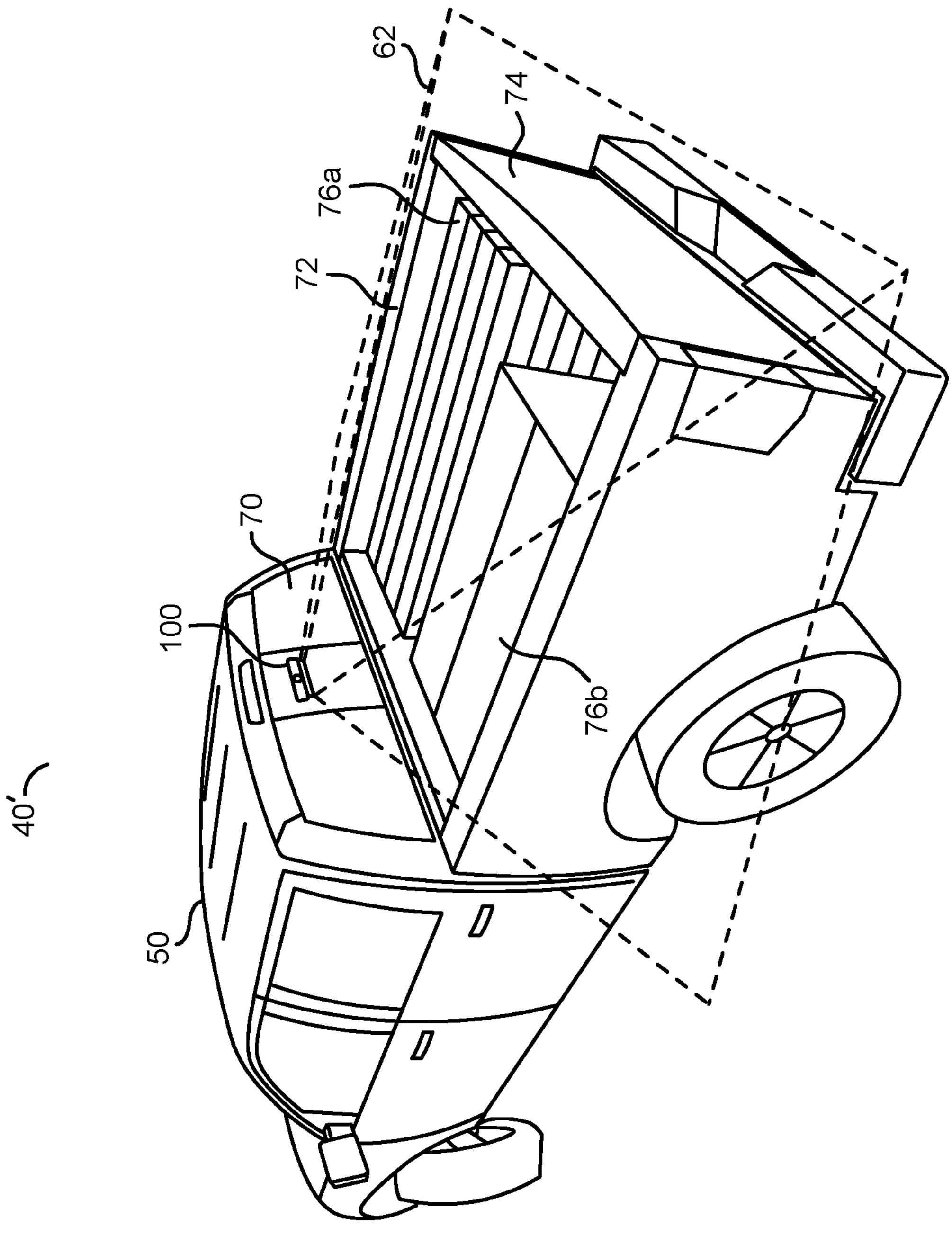
FIG. 2 is a diagram illustrating an example embodiment of the present invention configured to capture video of a truck bed.

Referring to FIG. 2, a diagram illustrating an example embodiment of the present invention configured to capture video of a truck bed is shown. The external view 40' may comprise the vehicle 50 implemented as a pickup truck. The pickup truck 50 may be a light duty vehicle, a medium duty vehicle, a heavy duty vehicle, etc. The pickup truck 50 may be an internal combustion engine (ICE) vehicle, a diesel vehicle, a hybrid electric vehicle, a battery electric vehicle, etc. The type of the pickup truck 50 implemented may be varied according to the design criteria of a particular implementation.

The pickup truck 50 may comprise a rear window 70 and/or a truck bed 72. A tailgate 74 is shown. Items 76*a*-76*b* are shown in the truck bed 72. In the example shown, the item 76*a* may be a stack of wood and the item 76*b* may be a box. The tailgate 74 may partially enclose the items 76*a*-76*b* in the truck bed 72.

The apparatus (or camera system) 100 may be installed on the rear window 70. The camera system 100 may be installed to enable the field of view 62 to capture an environment through the rear window 70 towards the rear end of the pickup truck 50. The field of view 62 is shown capturing a view of the truck bed 72.

In the example shown, the camera system 100 may be implemented as a truck bed monitoring camera. The camera system 100 may be configured to monitor the objects 76*a*-76*b* in the truck bed 72. In an example, the camera system 100 may be implemented as a truck bed monitoring security camera. The camera system 100 may be configured to monitor the truck bed 72, the status of the tailgate 74 and/or the environment near the truck bed 72 (e.g., detect people, objects and/or animals that may be approaching the pickup truck 50 from the rear). In some embodiments, the camera system 100 may be installed as an aftermarket product. For example, the pickup truck 50 may be sold without a truck monitoring camera and the camera system 100 may be installed on the rear window 70 to monitor the truck bed 72. The implementation of the camera system 100 and/or when the camera system 100 is installed on the pickup truck 50 may be varied according to the design criteria of a particular implementation.

Figure 3:
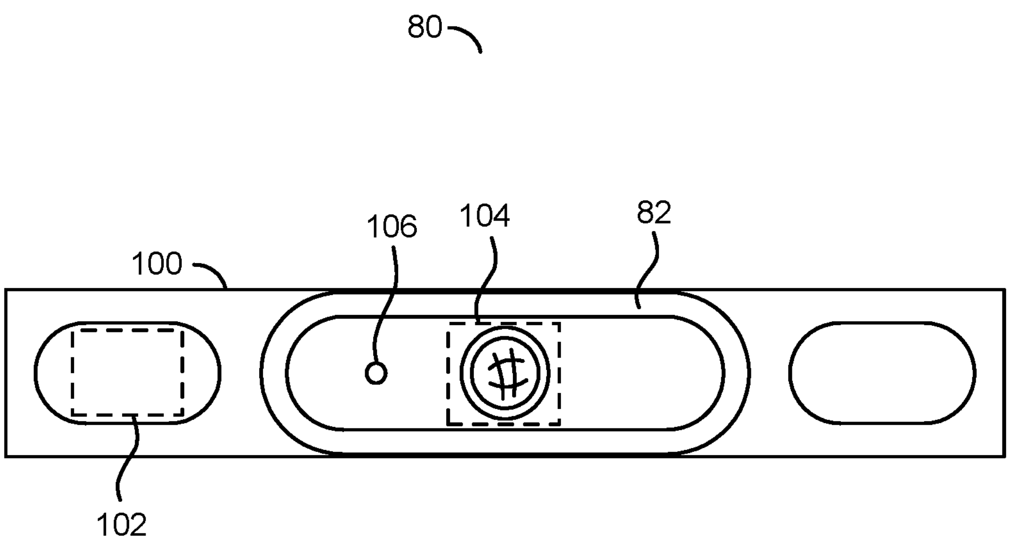
FIG. 3 is a diagram illustrating an example embodiment of the present invention comprising an adhesive.

Referring to FIG. 3, a diagram illustrating an example embodiment of the present invention comprising an adhesive is shown. A front view 80 of the camera system 100 is shown. The camera system 100 may comprise an adhesive 82, a block (or circuit) 102, a block (or circuit) 104 and/or a block (or circuit) 106. The circuit 102 may implement a processor. The circuit 104 may implement a capture device. The circuit 106 may implement a structured light projector. The camera systems 100*a*-100*n* may comprise other components (not shown). Details of the components of the cameras 100*a*-100*n* may be described in association with FIG. 5.

The adhesive 82 is shown on the front face of the camera system 100. The adhesive may be a glue, an epoxy, a double-sided tape, etc. The adhesive 82 may be implemented to enable the camera system 100 to adhere to the rear window 70 of the pickup truck 50. In an example, the front face of the camera system 100 may be generally flat to enable the adhesive 82 to stick flush to the rear window 70. The type of the adhesive 82 implemented may be varied according to the design criteria of a particular implementation.

The processor 102 may be configured to implement an artificial neural network (ANN). In an example, the ANN may comprise a convolutional neural network (CNN). The processor 102 may be configured to implement a large language model (LLM). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment 40). The capture device 104 may capture the pixel data comprising a background image (e.g., the environment 40) with the speckle pattern.

The cameras 100*a*-100*n* may be edge devices. The processor 102 implemented by each of the cameras 100*a*-100*n* may enable the cameras 100*a*-100*n* to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.). In some embodiments, calculations and/or other operations to initialize and/or generate results for an AI model may be performed locally by the processor 102.

In some embodiments, multiple camera systems may be implemented (e.g., camera systems 100*a*-100*n* may operate independently from each other). For example, each of the cameras 100*a*-100*n* may individually analyze the pixel data captured and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 4:
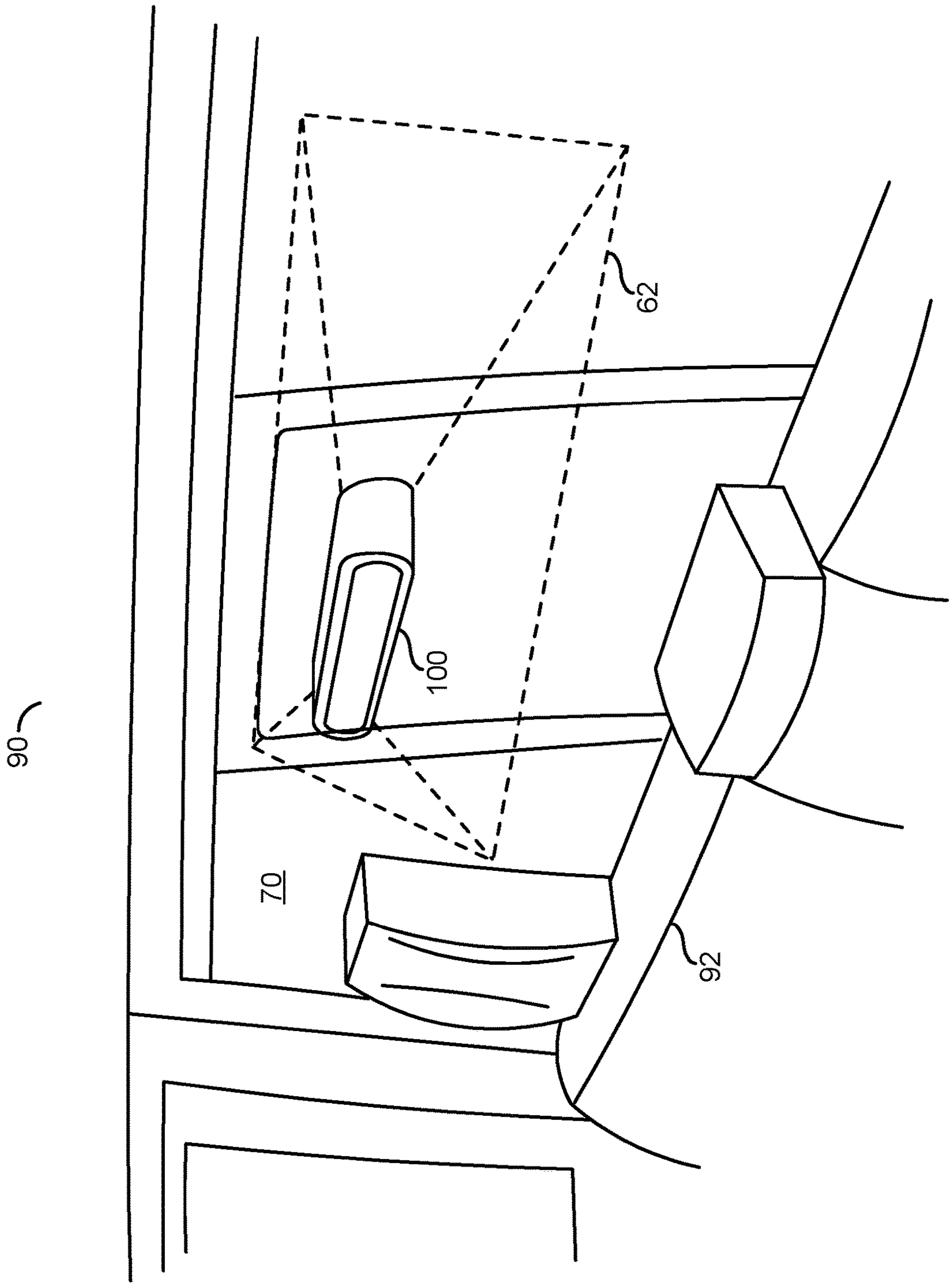
FIG. 4 is a diagram illustrating an example embodiment of the present invention configured to capture video through a rear window of a vehicle.

Referring to FIG. 4, a diagram illustrating an example embodiment of the present invention configured to capture video through a rear window of a vehicle is shown. An interior view 90 of the pickup truck 50 is shown. Rear seats 92 are shown in the interior view 90. The rear window 70 is shown behind rear seats 92.

The camera system 100 may be installed on the rear window 70. The front face of the camera system 100 with the adhesive 82 (described in association with FIG. 3) may be pressed against the rear window 70. The adhesive 82 may secure the camera system 100 to the rear window 70.

With the adhesive 82 holding the front face of the camera system 100, the capture device 104 may capture the environment 40' through the rear window 70. The field of view 62 is shown extending through the rear window 70. For example, the field of view 62 may extend through the rear window 70 and capture the truck bed 72, the tailgate 74, the items 76*a*-76*b* and/or the environment near the pickup truck 50.

Figure 5:
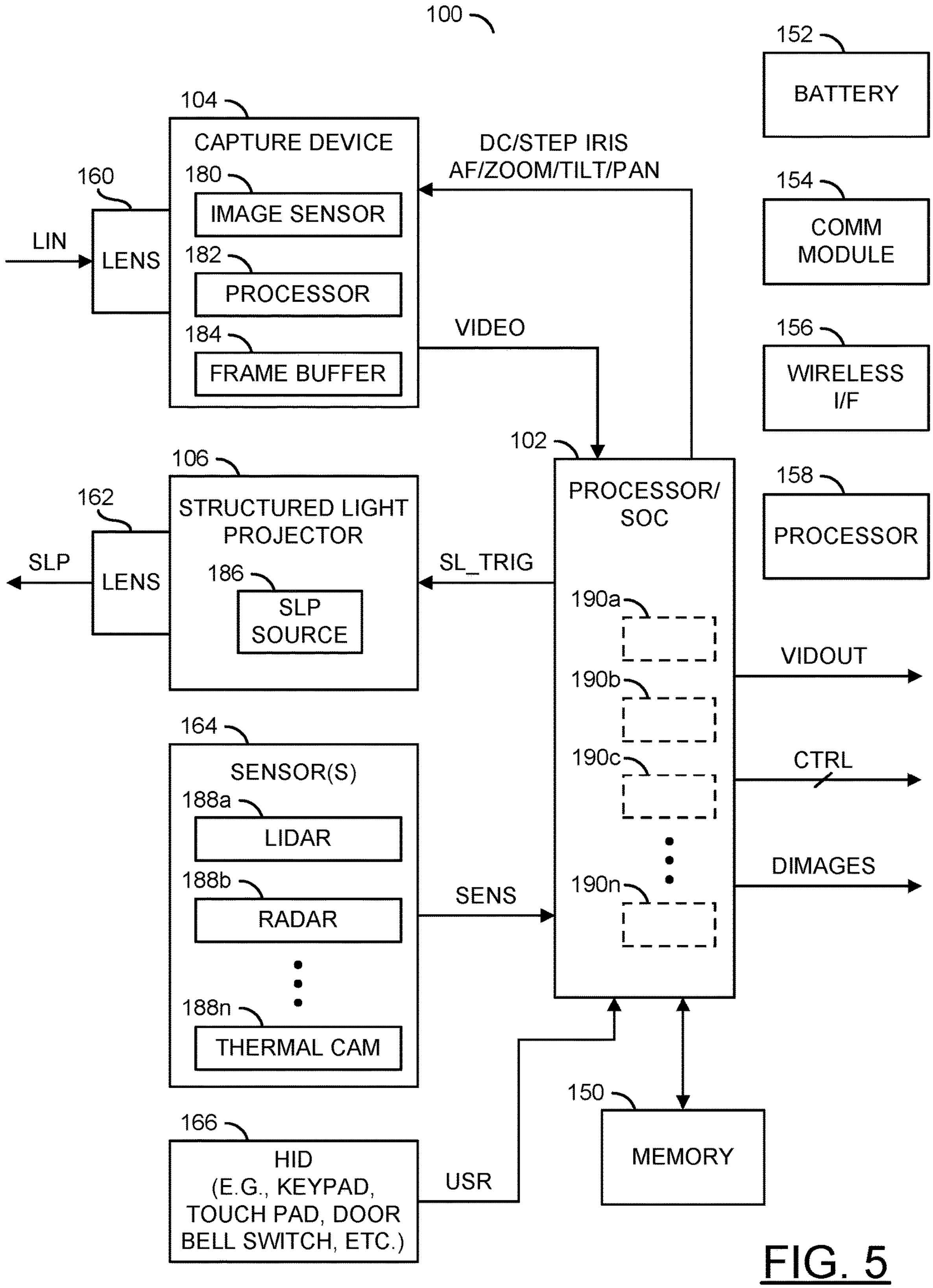
FIG. 5 is a block diagram illustrating a camera system configured to provide intelligent notifications for a truck bed camera enabled by smart metadata using image to text models.

Referring to FIG. 5, a block diagram illustrating a camera system configured to provide intelligent notifications for a truck bed camera enabled by smart metadata using image to text models is shown. The camera system 100 may be a representative example of the cameras 100*a*-100*n* shown in association with FIG. 1 and/or the camera system 100 shown in association with FIG. 2. The camera system 100 may comprise the processor/SoC 102, the capture device 104, and the structured light projector 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors. In the example shown, the sensors 164 may comprise blocks (or circuits) 188*a*-188*n*. The circuit 188*a* may implement a lidar. The circuit 188*b* may implement a radar. The circuit 188*n* may implement a thermal camera. The sensors 164 may comprise other types of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

The lidar 188*a* may be configured to generate a point cloud of the environment 40 (e.g., representing distances to various objects measured by the lidar 188*a*). The radar 188*b* may be configured to generate a high resolution radar map of the environment 40. The thermal camera 188*n* may be configured to capture a thermal image (e.g., a heat map of the environment 40). Each of the sensors 164 may provide an independent source of information about the environment 40. The number, type of sensor, and/or type of data generated by the sensors 164 may be varied according to the design criteria of a particular implementation.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

The processor/SoC 102 may receive the signal VIDEO, the signal SENS and/or the signal USR. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, the signal USR and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly, other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor

102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190*a*-190*n*. The blocks 190*a*-190*n* may implement various hardware modules implemented by the processor 102. The hardware modules 190*a*-190*n* may be configured to provide various hardware components to implement a video processing pipeline, a radar signal processing pipeline and/or an AI processing pipeline. The circuits 190*a*-190*n* may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190*a*-190*n* may be configured to implement various security features (e.g., secure boot, I/O virtualization, etc.). Various implementations of the processor 102 may not necessarily utilize all the features of the hardware modules 190*a*-190*n*. The features and/or functionality of the hardware modules 190*a*-190*n* may be varied according to the design criteria of a particular implementation. Details of the hardware modules 190*a*-190*n* may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190*a*-190*n* may be implemented as dedicated hardware modules. Implementing various functionality of the processor 102 using the dedicated hardware modules 190*a*-190*n* may enable the processor 102 to be highly optimized and/or customized to limit power consumption, reduce heat generation and/or increase processing speed compared to software implementations. The hardware modules 190*a*-190*n* may be customizable and/or programmable to implement multiple types of operations. Implementing the dedicated hardware modules 190*a*-190*n* may enable the hardware used to perform each type of calculation to be optimized for speed and/or efficiency. For example, the hardware modules 190*a*-190*n* may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190*a*-190*n* may enable computationally intensive operations (e.g., computer vision operations, video encoding, video transcoding, 3D reconstruction, depth map generation, liveness detection, etc.) to be performed locally by the camera system 100.

One of the hardware modules 190*a*-190*n* (e.g., 190*a*) may implement a scheduler circuit. The scheduler circuit 190*a* may be configured to store a directed acyclic graph (DAG). In an example, the scheduler circuit 190*a* may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

One or more of the hardware modules 190*a*-190*n* may be configured to implement other types of AI models. In one example, the hardware modules 190*a*-190*n* may be configured to implement an image-to-text AI model and/or a video-to-text AI model. In another example, the hardware modules 190*a*-190*n* may be configured to implement a Large Language Model (LLM). Implementing the AI model (s) using the hardware modules 190*a*-190*n* may provide AI acceleration that may enable complex AI tasks to be performed on an edge device such as the edge devices 100*a*-100*n*.

One of the hardware modules 190*a*-190*n* (e.g., 190*c*) may implement a sensor fusion module. The sensor fusion module 190*c* may be configured to receive the data from the sensors 164. In an example, the sensor fusion module 190*c* may be configured to receive a point cloud generated by the lidar 188*a*. In another example, the sensor fusion module 190*c* may be configured to receive a high resolution radar map from the radar module 188*b*. In yet another example, the sensor fusion module 190*c* may be configured to receive a thermal image from the thermal camera 188*n*. The sensor fusion module 190*c* may be configured to analyze independent sources of data together in order to make inferences about the data (e.g., inferences that may not be capable of determining from each individual data source, alone). The sensor fusion module 190*c* may be configured to determine the inferences in response to an analysis of the sensor data (e.g., provided by the signal SENS) and the video frames. For example, a combination of information from the video frames and the sensor data may provide additional context about the environment 40.

One of the hardware modules 190*a*-190*n* may be configured to perform the virtual aperture imaging. One of the hardware modules 190*a*-190*n* may be configured to perform transformation operations (e.g., FFT, DCT, DFT, etc.). The number, type and/or operations performed by the hardware modules 190*a*-190*n* may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogeneous processing resources (all circuits 190*a*-190*n* may have the same capabilities) or heterogeneous processing resources (two or more circuits 190*a*-190*n* may have different capabilities).

Figure 6:
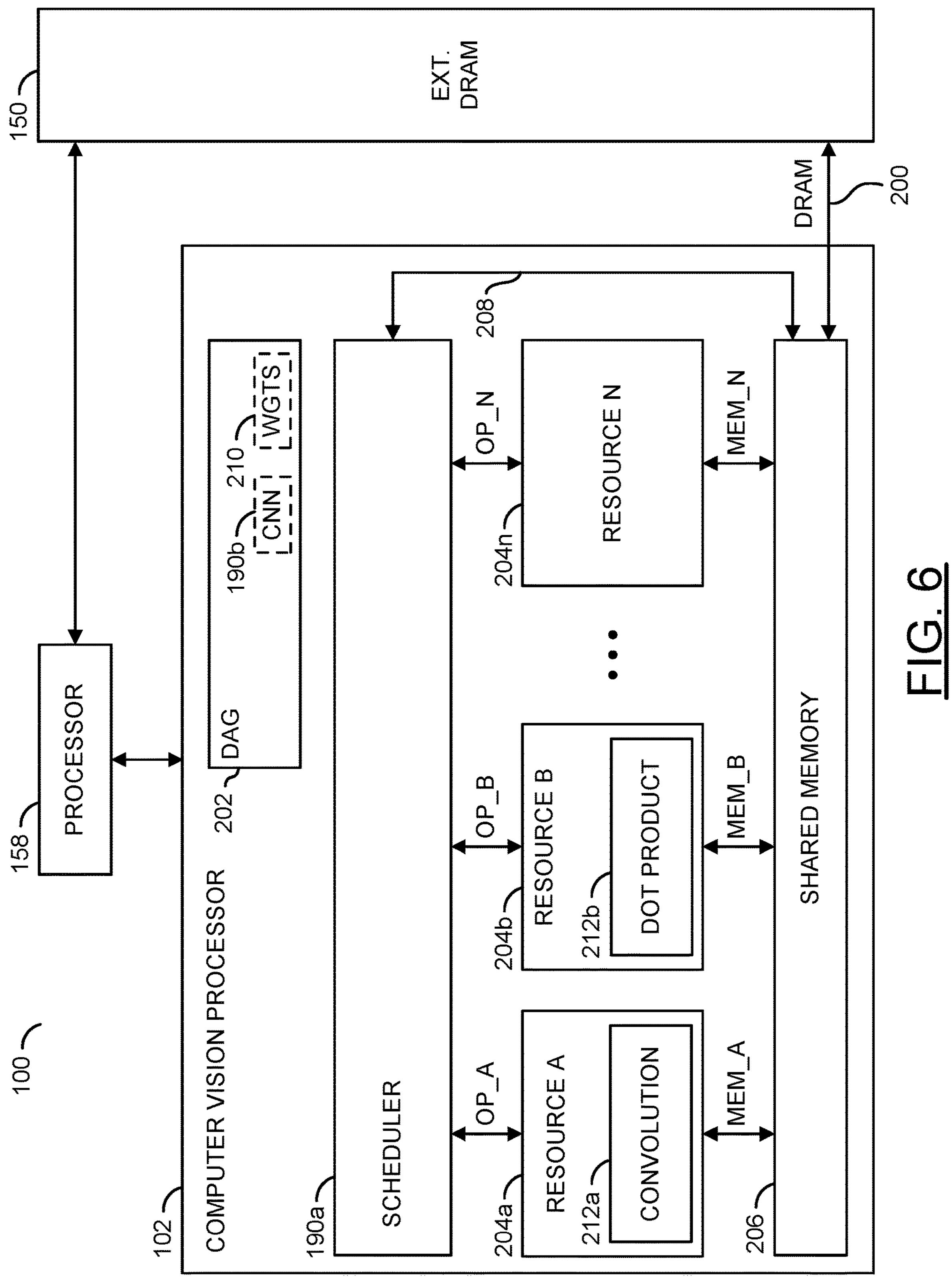
FIG. 6 is a block diagram illustrating processing circuitry of a camera system implementing a convolutional neural network configured to perform object-based detection using neural network models.

Referring to FIG. 6, a block diagram illustrating processing circuitry of a camera system implementing a convolutional neural network configured to perform object-based detection using neural network models is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation, virtual aperture imaging, high resolution radar reconstruction, radar object detection and/or object detection/classification for computer (or machine) vision may be implemented using hardware modules designed to reduce computational complexity and use resources efficiently.

In an example embodiment, the apparatus 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190*a*, a block (or circuit) 202, one or more blocks (or circuits) 204*a*-204*n*, a block (or circuit) 206 and a path 208. The block 202 may implement a directed acyclic graph (DAG) memory. The DAG memory 202 may comprise the CNN module 190*b* and/or weight/bias values 210. The blocks 204*a*-204*n* may implement hardware resources (or engines). The block 206 may implement a shared memory circuit. In an example embodiment, one or more of the circuits 204*a*-204*n* may comprise blocks (or circuits) 212*a*-212*n*. In the example shown, the circuit 212*a* and the circuit 212*b* are implemented as representative examples in the respective hardware engines 204*a*-204*b*. One or more of the circuit 202, the circuits 204*a*-204*n* and/or the circuit 206 may be an example implementation of the hardware modules 190*a*-190*n* shown in association with FIG. 5.

In an example, the processor 158 may be configured to program the circuit 102 with one or more pre-trained artificial neural network models (ANNs) including the convolutional neural network (CNN) 190*b* having multiple output frames in accordance with embodiments of the invention and weights/kernels (WGTS) 210 utilized by the CNN module 190*b*. In various embodiments, the CNN module 190*b* may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190*b* with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision and/or radar signal processing. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190*b*, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors, radar signal processors and/or AI acceleration processors implemented by the processing circuitry of the camera system 100 and configured to operate together.

In an example, the circuit 212*a* may implement convolution operations. In another example, the circuit 212*b* may be configured to provide dot product operations. The convolution and dot product operations may be used to perform computer (or machine) vision tasks (e.g., as part of an object detection process, etc.). In yet another example, one or more of the circuits 204*c*-204*n* may comprise blocks (or circuits) 212*c*-212*n* (not shown) to provide convolution calculations in multiple dimensions. In still another example, one or more of the circuits 204*a*-204*n* may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190*b* using the circuits 190*a*, 204*a*-204*n*, and 206.

Multiple signals (e.g., OP_A-OP_N) may be exchanged between the circuit 190*a* and the respective circuits 204*a*-204*n*. Each of the signals OP_A-OP_N may convey execution operation information and/or yield operation information. Multiple signals (e.g., MEM_A-MEM_N) may be exchanged between the respective circuits 204*a*-204*n* and the circuit 206. The signals MEM_A-MEM_N may carry data. A signal (e.g., DRAM) may be exchanged between the circuit 150 and the circuit 206. The signal DRAM may transfer data between the circuits 150 and 190*a* (e.g., on the transfer path 208).

The scheduler circuit 190*a* is generally operational to schedule tasks among the circuits 204*a*-204*n* to perform a variety of computer vision, radar signal processing and/or AI acceleration related tasks as defined by the processor 158. Individual tasks may be allocated by the scheduler circuit 190*a* to the circuits 204*a*-204*n*. The scheduler circuit 190*a* may allocate the individual tasks in response to parsing the directed acyclic graphs (DAGs) provided by the processor 158. The scheduler circuit 190*a* may time multiplex the tasks to the circuits 204*a*-204*n* based on the availability of the circuits 204*a*-204*n* to perform the work.

Each circuit 204*a*-204*n* may implement a processing resource (or hardware engine). The hardware engines 204*a*-204*n* are generally operational to perform specific processing tasks. The hardware engines 204*a*-204*n* may be implemented to include dedicated hardware circuits that are optimized for high-performance and low power consumption while performing the specific processing tasks. In some configurations, the hardware engines 204*a*-204*n* may operate in parallel and independent of each other. In other configurations, the hardware engines 204*a*-204*n* may operate collectively among each other to perform allocated tasks.

The hardware engines 204*a*-204*n* may be homogenous processing resources (e.g., all circuits 204*a*-204*n* may have the same capabilities) or heterogeneous processing resources (e.g., two or more circuits 204*a*-204*n* may have different capabilities). The hardware engines 204*a*-204*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204*a*-204*n* may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204*a*-204*n* implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204*a*-204*n* may be implemented solely as hardware circuits. In some embodiments, the hardware engines 204*a*-204*n* may be implemented as generic engines that may be configured through circuit customization and/or software/firmware to operate as special purpose machines (or engines). In some embodiments, the hardware engines 204*a*-204*n* may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204*a*-204*n* may be selected for a particular process and/or thread by the scheduler 190*a*. The scheduler 190*a* may be configured to assign the hardware engines 204*a*-204*n* to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190*a* and/or the hardware engines 204*a*-204*n*). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204*a*-204*n*. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190*a* to the shared memory 206. The transfer path 208 may also be operational to move data from the shared memory 206 to the scheduler circuit 190*a*.

The processor 158 is shown communicating with the computer vision processor 102. The processor 158 may be configured as a controller for the computer vision processor 102. In some embodiments, the processor 158 may be configured to transfer instructions to the scheduler 190*a*. For example, the processor 158 may provide one or more directed acyclic graphs to the scheduler 190*a* via the DAG memory 202. The scheduler 190*a* may initialize and/or configure the hardware engines 204*a*-204*n* in response to parsing the directed acyclic graphs. In some embodiments, the processor 158 may receive status information from the scheduler 190*a*. For example, the scheduler 190*a* may provide a status information and/or readiness of outputs from the hardware engines 204*a*-204*n* to the processor 158 to enable the processor 158 to determine one or more next instructions to execute and/or decisions to make. In some embodiments, the processor 158 may be configured to communicate with the shared memory 206 (e.g., directly or through the scheduler 190*a*, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 7:
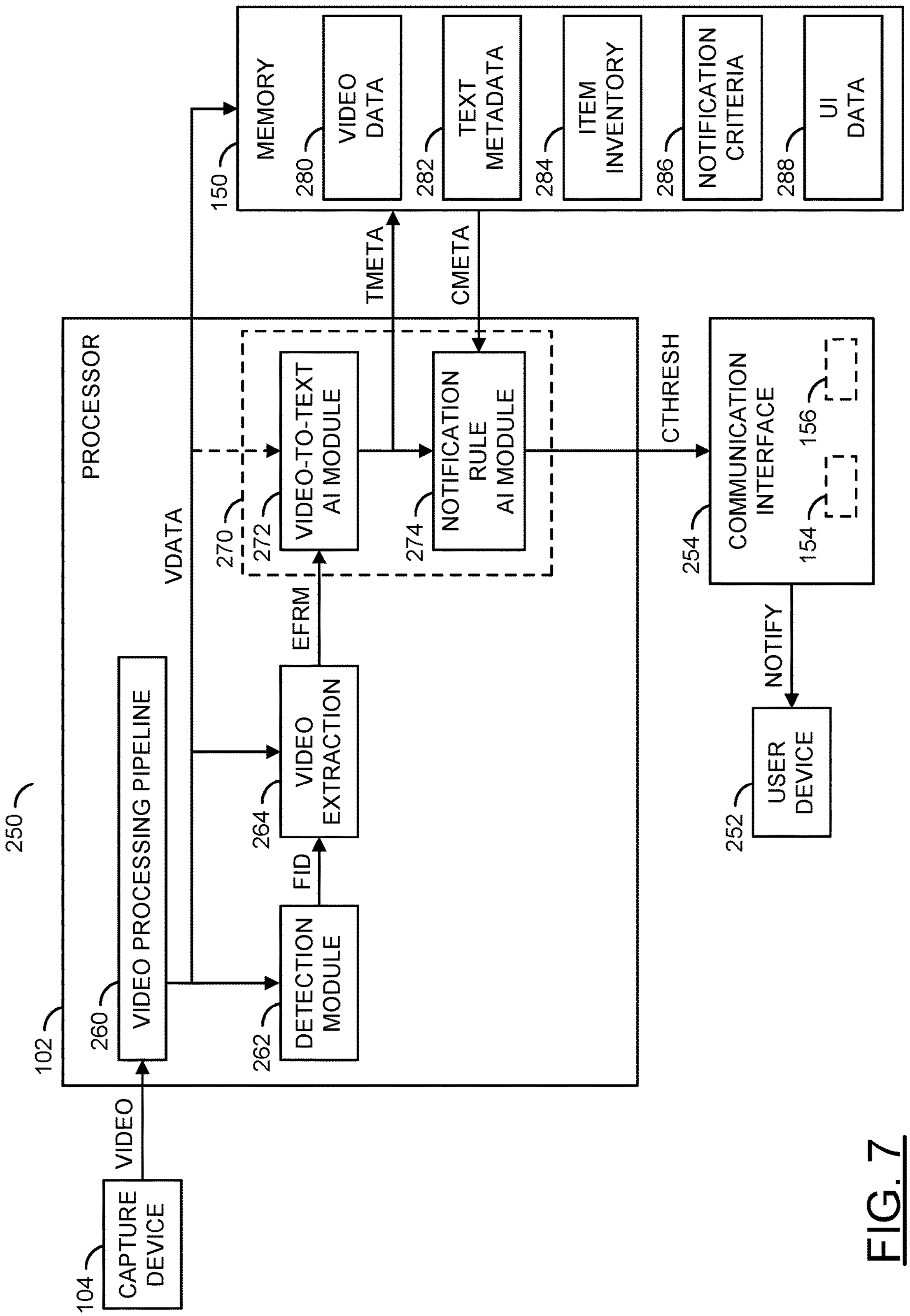
FIG. 7 is a block diagram illustrating AI models implemented by a processor to perform video to text extraction and item detection.

Referring to FIG. 7, a block diagram illustrating AI models implemented by a processor to perform video to text extraction and item detection is shown. An example implementation 250 is shown. The example implementation 250 may be a representative example of implementing AI models to perform text extraction and/or notification criteria detection on one of the edge devices 100*a*-100*n*. In some embodiments, the AI models may be implemented on the edge devices 100*a*-100*n* (e.g., without offloading computation to a cloud computing service). Whether the AI models may be implemented on the edge devices 100*a*-100*n* as shown in the example implementation 250 may depend on the processing capabilities of the processor 102, a power budget and/or a complexity of the AI models implemented.

The example implementation 250 may comprise the processor 102, the capture device 104, the memory 150, a block (or circuit) 252 and/or a block (or circuit) 254. The circuit 252 may implement a user device. The circuit 254 may implement a communication interface of the edge devices 100*a*-100*n*. The example implementation 250 may comprise other components (not shown). The number, type and/or arrangement of the components of the example implementation 250 may be varied according to the design criteria of a particular implementation.

The user device 252 may be a device separate from the edge devices 100*a*-100*n*. The user device 252 may be configured to connect to the edge devices 100*a*-100*n* (e.g., via the communication interface 254). In some embodiments, the user device 252 may connect directly to one or more of the edge devices 100*a*-100*n* (e.g., a peer-to-peer connection). In some embodiments, the user device 252 may connect to a network comprising the edge devices 100*a*-100*n* (e.g., a local area network, a third party service that facilitates connecting to the edge devices 100*a*-100*n*, a cloud computing service, etc.). The method of connecting the user device 252 to the edge devices 100*a*-100*n* may be varied according to the design criteria of a particular implementation.

The user device 252 may represent various user devices. In one example, the user device 252 may be a smartphone. In another example, the user device 252 may be a desktop computer, a laptop computer, a tablet computing device, a smartwatch, a security terminal, etc. The types devices used as the user device 252 may be varied according to the design criteria of a particular implementation.

The user device 252 may enable end users to communicate with the edge devices 100*a*-100*n* and/or other networks. In one example, a companion application may be configured to operate on the user device 252. The companion application may enable users to adjust settings of the edge devices 100*a*-100*n*. The companion application may enable users to view video captured by the edge devices 100*a*-100*n* (e.g., directly from the edge devices 100*a*-100*n* and/or streamed via a cloud service). Generally, the user device 252 may comprise a display (e.g., for image and/or video output), a speaker (e.g., for audio output), an input device (e.g., a keyboard, a touchscreen display, a microphone, etc.) and/or a communication device.

The user device 252 may enable an end user to provide input to one or more of the edge devices 100*a*-100*n*. For example, the end user may set various preferences. The preferences may comprise the types of notifications to receive (e.g., text, push, audio, etc.), the types of events to receive notifications about (e.g., types of objects to detect, faces to detect, thresholds for factors such as audio and motion thresholds, etc.) and/or urgency level settings. The user device 252 may enable the end user to enter queries for searching video data captured, provide criteria for notification rules, view an inventory of items detected, etc., The user device 252 may enable the end user to tag video captured for providing training data to the various AI models.

The user device 252 may enable the end user to receive output from one or more of the edge devices 100*a*-100*n*. In one example, the end user may receive notifications from the edge devices 100*a*-100*n* (or through an intermediary such as a cloud computing service) via the user device 252. In another example, the end user may receive a video stream from the edge devices 100*a*-100*n* via the user device 252. In yet another example, the end user may receive search results in response to a query (e.g., selective portions of the video data captured) from the edge devices 100*a*-100*n* via the user device 252. In the example implementation 250 shown, the user device 252 may receive a notification in response to objects and/or events detected in the video data based on notification rule settings and/or criteria determined by AI models and/or user preferences.

The communication interface 254 may facilitate communication between the user device 252, one of the edge devices 100*a*-100*n* and/or other networks. The communication interface 254 may comprise the communication module 154 and/or the wireless interface 156. The communication interface 254 may be configured to receive a signal (e.g., CTHRESH). The communication interface 254 may be configured to generate a signal (e.g., NOTIFY). In one example, the signal NOTIFY may be generated in response to the signal CTHRESH. The signal NOTIFY may be presented to the user device 252.

The processor 102 may be configured to receive the signal VIDEO from the capture device 104. The processor 102 may be configured to generate a signal (e.g., VDATA), a signal (e.g., TMETA) and/or the signal CTHRESH. The processor 102 may be configured to receive a signal (e.g., CMETA). The signal VDATA may comprise processed video data. The signal TMETA may comprise text description metadata (e.g., smart metadata). The signal CMETA may comprise a feature set and/or criteria (e.g., video detection and/or event detection criteria) for generating notifications. The signal CTHRESH may provide an indication that a notification rule criteria threshold has been exceeded and/or an object/event has been detected. The signal NOTIFY may comprise a notification, a type of alert, audio, text and/or video. Generally, the processor 102 may communicate the signal VDATA and/or the signal TMETA to the memory 150 and the signal CTHRESH to the communication interface 254, and receive the signal CMETA from the memory 150. The number, type and/or data communicated by the signals in the example implementation 250 may be varied according to the design criteria of a particular implementation.

The processor 102 may comprise a block (or circuit) 260, a block (or circuit) 262, a block (or circuit) 264 and/or a block (or circuit) 270 The circuit 260 may implement a video processing pipeline. The circuit 262 may implement a detection module. The circuit 264 may implement a video extraction module. The circuit 270 may implement an AI module. The processor 102 may comprise other components (not shown). One or more of the components 260-270 may be implemented by programming the hardware modules 190*a*-190*n*. The number, type and/or arrangement of the components of the processor 102 may be varied according to the design criteria of a particular implementation.

The video processing pipeline 260 may be configured to receive the signal VIDEO. The video processing pipeline 260 may be configured to generate the signal VDATA in response to the signal VIDEO. The video processing pipeline 260 may be configured to present the signal VDATA to the memory 150 (e.g., for storage), the detection module 262, the video extraction module 264 and/or the AI module 270.

The video processing pipeline 260 may be configured to receive the pixel data in the signal VIDEO. The video processing pipeline 260 may be configured to process the pixel data arranged as video frames. The signal VDATA may comprise the video frames generated by the video processing pipeline 260. In some embodiments, the video frames generated by the video processing pipeline 260 may comprise encoded video frames. In some embodiments, the video frames generated by the video processing pipeline 260 may comprise raw data that may be used for various types of analysis (e.g., motion detection, object detection, cropping, auto-balance, depth analysis, behavior detection, cropping, stabilization, upscaling, downscaling, dewarping, formatting for an output device, etc.) as described in association with FIG. 5. The video processing pipeline 260 may be configured to prepare the raw pixel data for further analysis by the components 262-270, for communication to other devices and/or for storage in the memory 150.

The detection module 262 may be configured to receive the signal VDATA. The detection module 262 may be configured to generate a signal (e.g., FID). The signal FID may be generated in response to the signal VDATA. The signal FID may comprise a frame ID and/or frame numbers. The signal FID may be presented to the video extraction module 264.

The detection module 262 may be configured to detect particular types of information in the video data. In an example, the detection module 262 may comprise a detection threshold and/or a preliminary detection criteria. For example, the detection threshold and/or criteria may be a user defined value. The detection module 252 may perform analysis on the video data to determine whether a particular type of information in the video data exceeds the detection threshold and/or meets the preliminary detection criteria. In one example, the detection module 262 may implement the CNN module 190*b* to perform object and/or behavior detection. The detection module 262 may determine the frame numbers and/or timestamps that correspond to video data that has the particular type of information that exceeds the detection threshold and/or meets the preliminary detection criteria.

In one example, the detection module 262 may implement motion detection. The detection threshold may be a motion threshold and the detection module 262 may be configured to detect motion in the video data. In another example, the detection module 262 may implement object detection. The preliminary detection criteria may be a particular type of object (or objects) and the detection module 262 may be configured to perform object detection in the video data. In yet another example, the detection module 262 may implement facial detection. The preliminary detection criteria may be one or more pre-defined faces and the detection module 262 may be configured to recognize faces in the video data. In still another example, the detection module 262 may implement audio detection. The detection threshold may be a volume level and/or the detection criteria may be a particular type of audio signature (e.g., detecting particular types of sounds such as animal noises, broken glass, screams, etc.) and the detection module 262 may be configured to analyze the audio captured with the video data. The type of detections performed by the detection module 262 and/or the detection threshold used may be a user-defined preference and/or may be varied according to the design criteria of a particular implementation.

The detection module 262 may be implemented to detect initial conditions for performing more advanced analysis of the video data. The meeting and/or exceeding of the detection threshold/criteria may be used as a trigger for performing an analysis by the AI module 270. For example, instead of performing video-to-text operations and/or analyzing for notification criteria on all of the video data, the detection module 262 may be used to detect video frames that are likely to have interesting and/or relevant information. In one example, a vehicle sentry camera operating while a vehicle is parked may generally capture the same scene (e.g., an empty driveway or other vehicle in a parking lot). Continually generating smart metadata describing the same scene may not be beneficial and/or unnecessarily consume resources. The detection module 262 may be configured to detect when the scene changes (e.g., a person approaches the vehicle, people walking nearby in a parking lot, an intruder tries to break into the vehicle, etc.). Implementing the detection module 262 may be optional.

The video extraction module 264 may be configured to receive the signal VDATA and/or the signal FID. The video extraction module 264 may be configured to generate a signal (e.g., EFRM). The signal EFRM may be generated in response to the signal VDATA and the signal FID. The signal EFRM may comprise extracted video frames. For example, the signal EFRM may comprise a subset of captured video frames with less than all of the video frames in the signal VDATA. The signal EFRM may be presented to the AI module 270.

The video extraction module 264 may be configured to select a subset of the video data. The detection module 262 may provide timestamps, a range of timestamps, frame numbers and/or a range of frame numbers to the video extraction module 264. The video extraction module 264 may extract the video frames from the video data in response to the timestamps, range of timestamps, frame numbers and/or ranges of frame numbers. Generally, the video extraction module 264 may select the subset of the video data that may comprise the pre-defined objects of interest, events of interest, motion, recognized faces, audio features, etc. The extraction of the subset of the video data may be optional (e.g., the operations performed by the detection module 262 and the extraction module 264 may not necessarily be performed).

The extraction of the subset of the video data may enable a limited group of video data to be analyzed using the AI module 270. For example, instead of performing the computationally intensive operations of the video-to-text AI and/or the notification rule AI on all of the video data, the combination of the detection module 262 and the extraction module 264 may select the video frames that may be most likely to be interesting to the end user, most likely to comprise an item to add to the inventory and/or most likely to comprise the criteria for sending a notification to the end user. In some embodiments, the video frames determined to be most likely to be interesting to the end user may be learned based on information provided by the AI module 270. For example, the AI module 270 may learn the types of events that the end user finds interesting (e.g., requests notifications for) and may provide the information about the interesting events to the detection module 262. In some embodiments, the signal CMETA may comprise feature set information that corresponds to the criteria for the notification rules and the AI module 270 may communicate the feature set to the detection module 262. The number of video frames extracted by the extraction module 264 may be varied according to the design criteria of a particular implementation.

The AI module 270 may be configured to implement one or more AI models and/or AI modules. In some embodiments, the AI module 270 may be configured to implement a single AI model. For example, the single AI model may be configured to implement video-to-text analysis. The video-to-text analysis may generate a plain text (e.g., natural language that may be human readable) description of the content of the video frames. The single AI model may be further configured to evaluate notification criteria. For example, the single AI model may simultaneously analyze the video data to create the text, and also continuously evaluate notification criteria using the text as the text is created. In some embodiments, the AI module 270 may implement multiple AI models. For example, a text-to-speech AI model may be configured to perform computer vision operations that generates the text description of what has happened and/or what has been detected in the video data. A notification rule AI model may be configured to analyze the generated text (e.g., instead of the video data) to determine whether the criteria for a notification rule has been met. Analyzing the text instead of the video data for the notification rule criteria may provide a less computationally intensive analysis than generating text and then re-analyzing the video for the notification rule criteria.

In the example shown, the AI module 270 may comprise a block (or circuit) 272 and/or a block (or circuit) 274. The circuit 272 may implement a video-to-text AI module (or model). The circuit 274 may implement a notification rule module (or model). The AI module 270 may comprise other components (not shown). Generally, the AI module 270 may comprise hardware configured to implement DAGs and/or LLMs. The number, and/or type of the AI models implemented by the AI module 270 may be varied according to the design criteria of a particular implementation.

The video-to-text AI module 272 may be configured to receive the video data from the signal VDATA or the video data from the signal EFRM. For example, the video-to-text AI module may be configured to operate on all of the video data (e.g., the signal VDATA) and/or the subset of the video frames likely to comprise an event of interest (e.g., the signal EFRM). The video-to-text AI module 272 may be configured to generate the signal TMETA. The signal TMETA may be generated by the video-to-text AI module 272 in response to the signal VDATA and/or the signal EFRM. The video-to-text AI module 272 may present the signal TMETA to the memory 150 and/or the notification rule AI module 274.

The video-to-text AI module 272 may be configured to perform an analysis of the video data and generate the smart metadata. The smart metadata may be presented in the signal TMETA. The video-to-text AI module 272 may be configured to generate the smart metadata by performing natural language processing and generate natural language text based on learned patterns and/or relationships between words in a particular spoken/written human language. The smart metadata may comprise a full text description of the video frames. The smart metadata may comprise a plain language description of the objects in the video frames, the context of the video frames, the colors in the video frames, the arrangement of the visual elements in the video frames, the behavior of objects in the video frames, the location of items in the video frames, the types of items in the video frames, etc. The smart metadata may be determined based on not only a current video frame, but also previous video frames and later video frames. For example, a single video frame of an item (e.g., a hammer) in the air may not provide sufficient information to determine a location and/or behavior of the item. Analyzing the previous and later video frames may provide context to enable the video-to-text AI module 272 to determine behavior such as whether the item in the air is being thrown into or falling out of the truck bed 72. The video-to-text AI module 272 may be configured to determine an inventory of items in the video frames analyzed. For example, the inventory of items may comprise a classification of items and/or a location of the items in response to various objects, behaviors and/or patterns detected. For example, the video-to-text AI module 272 may determine that a video frame comprises a toolbox, the size of the toolbox, a brand of the toolbox, where the toolbox is located, whether the toolbox is moving, etc. The method of describing the contents of the video data may be varied according to the design criteria of a particular implementation.

In one example, the video-to-text AI module 272 may implement a video-to-text AI model. In one example, the AI model implementing the video-to-text analysis may be a transformer network. In another example, the AI model implementing the video-to-text analysis may be performed using a convolutional neural network. Generally, the AI model implementing the video-to-text analysis may be a type of neural network. In one example, the AI model implementing the video-to-text analysis may provide bootstrapping language-image pre-training with frozen image encoders and large language models (e.g., BLIP-2). The AI model may be implemented based on a generic and efficient pre-training strategy that bootstraps vision-language pre-training from off-the-shelf, frozen, pre-trained image encoders and frozen large language models. The AI model may comprise a querying transformer pre-trained with a first stage that bootstraps vision-language representation learning from a frozen image encoder and a second stage that bootstraps vision-to-language generative learning from a frozen language model. In another example, the AI model may be implemented based on a Flamingo80B model. The AI model implemented by the video-to-text AI module 272 may be configured with emerging capabilities of zero-shot image-to-text generation that may follow natural language instructions. Details of the video-to-text AI module 272 may be described in U.S. patent application Ser. No. 18/210,931, filed on Jun. 16, 2023, appropriate portions of which are incorporated by reference. The type of AI model implemented for video-to-text may be varied according to the design criteria of a particular implementation.

In some embodiments, the notification rule AI module 274 may be configured to receive the signal TMETA. For example, the notification rule AI module 274 may determine whether the notification rule criteria has been met based on the text description provided by the smart metadata for the video frames. In some embodiments, the notification rule AI module 274 may be configured to receive the signal VDATA and/or the signal EFRM. For example, the notification rule AI module 274 may determine whether the notification rule criteria has been met by analyzing the video data based on computer vision operations. The notification rule AI module 274 may receive the signal CMETA and generate the signal CTHRESH. The notification rule AI module 274 may receive the signal CMETA comprising the criteria for generating notifications. The notification rule AI module 274 may generate the signal CTHRESH in response to the signal CMETA and the signal TMETA and/or the signal VDATA (or the signal EFRM). The notification rule AI module 274 may receive the signal CMETA from the memory 150. The notification rule AI module 274 may present the signal CTHRESH to the communication interface 254.

The notification rule AI module 274 may be configured to perform a notification rule analysis for the video frames. The generation of the notification may be determined in response to the video data (or the text description of the video data in the signal TMETA) and the criteria for the notification rules provided by the signal CMETA. The items in the video frame and/or objects in the video frames (e.g., behavior of the people detected) may be compared to a criteria threshold. Each of the notification rules may have an individual criteria threshold.

The criteria threshold may comprise one condition or multiple conditions. For example, a notification rule with a single criteria may be to generate a notification when "my water skis are removed from the truck bed" (e.g., a particular behavior of an item such as water skis). In another example, a notification rule with multiple criteria may be to generate a notification when "someone other than Bob or Alice reaches for my water skis" (e.g., an action performed by particular people, such as Bob and Alice, and performed on a particular item, such as water skis). The notification rule criteria may be a user-defined variable (e.g., provided via the HID 166). The notification rule criteria analysis performed may enable the notifications generated to be relevant. For example, the notification rule criteria analysis may be configured to prevent false positive alerts and/or prevent overwhelming the end user with notifications. The notification rule criteria analysis performed by the notification rule AI module 274 may be performed independent from the detection analysis, the video-to-text analysis and/or searching the inventory of items by the end user.

The notification rule AI module 274 may implement an AI model. The AI model implemented by the notification rule AI module 274 may be configured to analyze the video frames to determine whether criteria for one or more notification rules has been met. The AI model implemented by the notification rule AI module 274 may perform computer vision operations. In one example, the AI model implemented by the notification rule AI module 274 may implement an ANN such as a convolutional neural network. The notification rule AI module 274 may be configured to determine whether the video frames comprise information that may be worthwhile to present to the end user. The notification rule criteria analysis may be performed based on the objects detected, particular faces detected, behavior of objects detected in the video frames, etc.

In some embodiments, the particular types of video content that may comprise worthwhile information may be pre-defined based on preferences selected by the user (e.g., user preferences selected using the HID 166). In some embodiments, the particular types of video content that may comprise worthwhile information may be learned in response to other notification rules made by the end user and/or queries provided by the end user. For example, if the end user regularly asks about what is being taken from a cooler, then the notification rule AI module 274 may train the AI model to provide notification rules for the video data that comprises items taken from the cooler. In another example, if the end user regularly asks about when a particular person (e.g., a suspected thief) approaches the vehicle 50 but does not ask about when another person (e.g., a friend) approaches the vehicle 50, then the notification rule AI module 274 may train the AI module to provide notification rules that generate alerts for the suspected thief and create notification rules that suppress and/or prevent notifications for the friend. The particular criteria for notification rules for various types of video content may be varied according to the design criteria of a particular implementation.

The learned behavior and/or particular notification rules of the end user may be used to individualize the notifications generated for each end user. The notification rule AI module 274 may be configured to select distinct sets of notification rules for multiple end users. Some of the end users may have common notification rules (e.g., all users may have notification rules for security issues such as break-ins). Other users may have specific preferences (e.g., a parent may want to be notified if a child is letting friends ride in the truck bed 72). In some embodiments, the notification rule AI module 274 may be configured to parse natural language input from each user to determine the notification preferences. For example, the end user may input a natural language description of the event (e.g., "send me an audio notification when Alice takes an item from my cooler"). In some embodiments, a separate LLM AI module may be implemented to parse the natural language from the natural language preference input and convert the natural language into criteria for the notification rules into a format usable by the notification rule AI module 274. In one example, a user with an expensive tool chest in the truck bed 72 may prefer to receive a notification every time an unknown person is within 10 feet of the truck bed 72 (e.g., low threshold criteria for car proximity), but may not care about when a co-worker approaches the truck bed 72. Similarly, another user may not care about people near a car, but may prefer to receive an immediate notification when a particular item is removed from the truck bed (e.g., low urgency for car proximity and high urgency for item movement). The criteria and/or notification rules for each user may change over time as behaviors and/or preferences change. The notification rule AI module 274 may be configured to learn the preferences of each individual user based on the queries asked when searching for videos, pre-defined input preferences, the notification rules created and/or the video results selected from search results provided.

The signal CTHRESH may be generated based on the criteria of the notification rules. In some embodiments, the criteria may comprise multiple thresholds and the signal CTHRESH may be generated based on the particular thresholds met for the criteria. For example, the criteria threshold may comprise a numerical value (e.g., a 1 to 5 scale, a binary scale, a three state scale, etc.) for an urgency level for the notification rule that may be determined for various events detected. For example, detecting nothing may not meet any criteria, resulting in no notification generated, detecting a sports bag sliding around and bouncing around in the truck bed 72 may meet a first urgency level criteria, resulting in a text notification, and the sports bag falling out of the truck bed 72 may meet a second urgency level criteria, resulting in an audio alert with a geotag to identify where the sports bag fell out of the truck bed 72. The notification rules AI model 274 may provide relevant notifications for a camera sentry mode in a vehicle. The granularity of alerts and/or the criteria for each level of alert for each notification rule may be varied according to the design criteria of a particular implementation.

The communication interface 254 may generate the signal NOTIFY in response to the signal CTHRESH. The signal NOTIFY may comprise the notification generated in response to the notification rule criteria analysis performed by the notification rules AI model 274. In some embodiments, the notification may comprise contextual information about the particular detection. For example, the notification rule AI model 274 may generate the signal CTHRESH with the smart metadata in the signal TMETA. Providing the signal CTHRESH with the smart metadata may enable the signal NOTIFY to comprise a human readable description of the event detected. For example, the signal NOTIFY may comprise a plain language description of the event in addition to (or instead of) providing the video data (e.g., the notification may provide a text description that someone stole an item from the truck bed 72). In some embodiments, the signal NOTIFY may comprise the video data. For example, the signal NOTIFY may comprise a video clip (e.g., extracted by the video extraction module 264) of the thief near the truck bed 72 for the user to view on the user device 252. The format of the notification provided may be varied according to the design criteria of a particular implementation.

The memory 150 may comprise a block (or circuit) 280, a block (or circuit) 282, a block (or circuit) 284, a block (or circuit) 286 and/or a block (or circuit) 288. The circuit 280 may comprise video data storage. The circuit 282 may comprise text metadata. The circuit 284 may comprise an item inventory. The circuit 286 may comprise notification criteria. The circuit 288 may comprise user interface (UI) data. The memory 150 may comprise other types of data storage (not shown). The number, type and/or arrangement of the data stored by the memory 150 may be varied according to the design criteria of a particular implementation.

The video data storage 280 may store the video frames generated by the video processing pipeline 260. The memory 150 may receive the signal VDATA from the video processing pipeline 260 and store the video frames as the video data storage 280. The video data storage 280 may provide storage for the video frames to be output to a video device (e.g., a monitor) and/or streamed to another device (e.g., the user device 252).

The text metadata 282 may store the smart metadata generated by the video-to-text AI module 272. The memory 150 may receive the signal TMETA from the video-to-text AI module 272 and store the smart metadata as the text metadata 282. The text metadata storage 282 may provide storage for the smart metadata to enable the generation of an inventory and/or to enable the notification rule AI module 274 to determine whether the criteria for a notification rule has been met. The text metadata 282 may be associated with the video data storage 280. In an example, each of the video frames stored in the video data storage 280 may comprise a timestamp and the smart metadata in the text metadata 282 may comprise the timestamp to enable the smart metadata to correspond to the video frames. Criteria for notification rules provided by the end user may be compared to the smart metadata in the text metadata 282 in order to generate the notification. The text metadata 282 may comprise the full text description of the video contents.

The item inventory 284 may store the object data, object behavior, object location, etc. generated by the video-to-text AI module 272. The memory 150 may receive the signal TMETA from the video-to-text AI module 272 and store the information about the items as the item inventory 284. For example, the item inventory 284 may comprise an identifier (e.g., a name) for each item, a description of each item, a location of each item, an amount of time each item has been at the location, a change in location over time, etc. In some embodiments, a group of similar items may be combined (e.g., a bundle of wood may be combined as a single inventory item). In some embodiments, multiple items of the same type may be disambiguated (e.g., two hammers may be identified as separate items). If multiple items of the same type are stored in the item inventory 284, then the item identifier may further comprise a characteristic (e.g., green handle hammer and blue handle hammer). In some embodiments, an item that has been combined as a single inventory item may be later separated into multiple items as circumstance changes are detected over time (e.g., the stack of wood may be separated into a stack of wood item and a separate wood plank item if a single piece of wood falls off the stack of wood). The type of data and/or the arrangement of the data for storing the item inventory 284 may be varied according to the design criteria of a particular implementation.

The item inventory 284 may be used to enable the end user to create the notification rules. For example, the end user may select an item from the item inventory 284 and create a rule (e.g., select the toolbox to create a notification rule for the toolbox). The item inventory 284 may be used to enable the end user to search for a particular item in the vehicle 50. For example, the end user may select an item from the item inventory 284 and the item inventory may provide the item location (e.g., "the hammer with the green handle was last located in the right side of the truck bed near the tailgate"). The item inventory 284 may be used to enable the notification rule AI module 274 to distinguish between objects detected in the video frames to determine whether the criteria for a notification rule has been met. In some embodiments, the item inventory 284 may further comprise information for identifying particular people. For example, particular people may be treated similar to items in the item inventory 284 to enable people to be part of the notification rules.

The notification criteria 286 may store the criteria for each of the notification rules. The memory 150 may be configured to receive input from the end user (e.g., the signal USR), which may be stored as the notification criteria 286. The notification criteria 286 may be used to generate the signal CMETA. The notification criteria 286 may comprise distinct criteria for each notification rule in order to generate the notification. In an example, the end user may select an item from the item inventory 284 and apply criteria for the notification rule. The notification criteria 286 may be provided as plain text (e.g., "send me an audio alert when anyone other than me reaches inside the truck bed"). For example, the notification criteria 286 may store reference images of the end user to associate with "me" and apply the notification rule to all of the items in the item inventory 284. In some embodiments, the notification criteria 286 may comprise criteria for the vehicle 50 (e.g., a notification when a person approaches the vehicle 50). In some embodiments, the notification criteria 286 may comprise at least an item, a condition and/or an alert type. In one example, the item may be a hammer, the condition may be whether the hammer is in the truck bed or not, and the alert type may be an audio alert. The notification criteria 286 may be individually created by each end user. In some embodiments a notification rule may be a negative rule that suppresses a notification (e.g., "Do not send a notification if the garbage bag is removed from the truck"). The particular format of the notification criteria 286 and/or the number of notification criteria 286 stored may be varied according to the design criteria of a particular implementation.

The UI data 288 may comprise an interface layout that may enable the user device 252 to interact with the edge devices 100*a*-100*n*. In one example, the edge devices 100*a*-100*n* may provide a web-based interface to enable the end user to receive information from the edge devices 100*a*-100*n* and/or provide input to the edge devices 100*a*-100*n*. The web-interface may be generated based on the UI data 288. Details about the UI data 288 may be illustrated in association with FIG. 14. The UI data 288 may facilitate the output generated by and the input presented to the edge devices 100*a*-100*n*. The layout of the UI data 288 may be varied according to the design criteria of a particular implementation.

Figure 8:
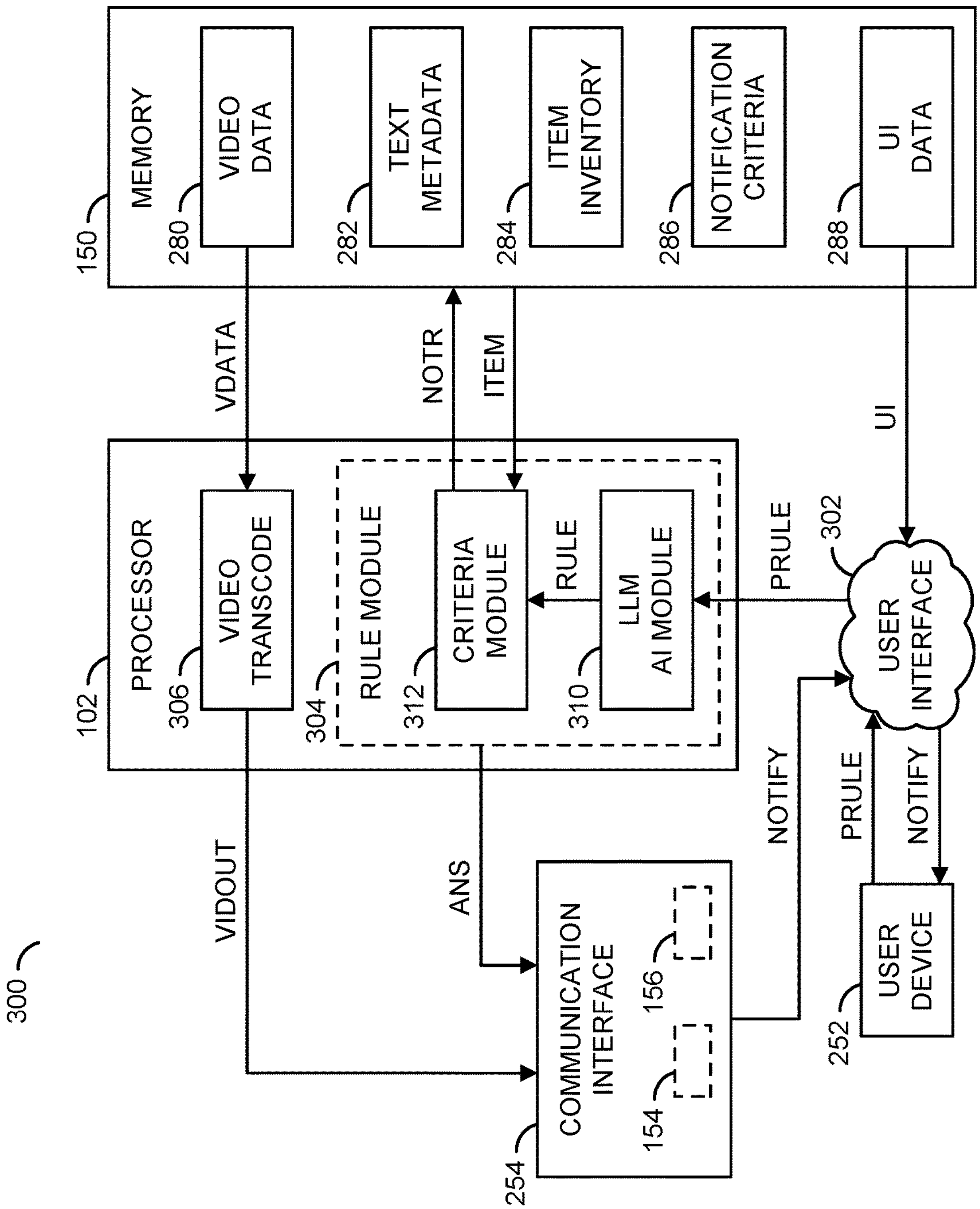
FIG. 8 is a block diagram illustrating analyzing a user input using an AI model implemented by a processor to perform a natural language search.

Referring to FIG. 8, a block diagram illustrating analyzing a user input using an AI model implemented by a processor to perform a natural language search is shown. An example implementation 300 is shown. The example implementation 300 may be a representative example of implementing AI models to perform a natural language notification rule creation and/or a natural language search to provide video results for one of the edge devices 100*a*-100*n*. In some embodiments, the AI models may be implemented on the edge devices 100*a*-100*n* (e.g., without offloading computation to a cloud computing service). Whether the AI models may be implemented on the edge devices 100*a*-100*n* as shown in the example implementation 300 may depend on the processing capabilities of the processor 102, a power budget and/or a complexity of the AI models implemented.

The example implementation 300 may comprise the processor 102, the memory 150, the user device 252, the communication interface 254 and/or a block (or circuit) 302. The block 302 may implement a user interface. The example implementation 300 may comprise other components (not shown). The number, type and/or arrangement of the components of the example implementation 300 may be varied according to the design criteria of a particular implementation.

The user interface 302 may be displayed on the user device 252. In some embodiments, the user interface 302 may be provided in response to a local area connection with the communication interface 254. In some embodiments, the user interface 302 may be provided in response to a connection with a cloud computing service. In one example, the user interface 302 may be a web-based interface. In another example, the user interface 302 may be provided using a companion app for the edge devices 100*a*-100*n*. In yet another example, the user interface 302 may be implemented directly on the edge devices 100*a*-100*n* (e.g., the HID 166 may provide a touchscreen interface that may display the user interface 302).

The user interface 302 may receive a signal (e.g., UI), a signal (e.g., PRULE) and/or the signal NOTIFY. The user interface 302 may provide the signal NOTIFY and/or the signal PRULE. The user interface 302 may send/receive other signals. The number, type and/or data provided to/from the user interface 302 by each of the signals may be varied according to the design criteria of a particular implementation.

The signal UI may comprise the user interface information to enable the user interface 302 to be displayed on the user device 252. The signal UI may be generated based on the data stored in the UI data storage 288. The signal NOTIFY may comprise video output and/or the natural text description from the edge devices 100*a*-100*n*. The signal PRULE may comprise a plain text and/or natural language description of a notification rule provided by the end user. The signal NOTIFY may comprise the results generated in response to the search parameters.

The end user may use the user interface 302 to input criteria for notification rules (e.g., a signal PRULE). The processor 102 may enable the end user to input the criteria as a plain language description. For example, the end user may input criteria for a notification rule such as, "Notify me when someone takes may hammer out of the truck", "Let Alice take food from my cooler, but tell me when Bob does", "Send me an alert when someone reaches in my truck while its parked at the mall", etc. The input provided by the end user using the user device 252 may be presented from the user interface 302 to the processor 102 as the signal PRULE.

The processor 102 may comprise a block (or circuit) 304 and/or a block (or circuit) 306. The circuit 304 may implement a rule module. The circuit 306 may implement a video transcode module. The processor 102 may comprise other components (not shown). The number, type and/or arrangement of the components of the processor 102 may be varied according to the design criteria of a particular implementation.

The rule module 304 may be configured to receive the signal PRULE from the user interface 302. The rule module 304 may be configured to generate a signal (e.g., ANS) and/or a signal (e.g., NOTR). The signal ANS may comprise the natural text description. The natural text description in the signal ANS may comprise an answer generated by the rule module 304 in response to the query and/or request provided in a signal (e.g., QUERY, not shown). In some embodiments, the end user may use the user interface 302 to input search parameters in the signal QUERY. The processor 102 may enable the end user to input the search parameters as a plain language question. For example, the end user may input a question and/or request such as "Where is the hammer I left in my truck last week?", "How many people took beer from my cooler?", "Did I load my tools in my truck?".

The input provided by the end user using the user device 252 may be presented from the user interface 302 to the processor 102 as the signal QUERY. In one example, the natural text description in the signal ANS may be provided in response to a question from the end user instead of providing video search results. For example, the signal ANS may provide an answer of "the hammer is near the tailgate on the left side". In another example, if there were no videos captured of anyone taking a beer from the cooler, the signal ANS may response with "nobody took a beer" and no video results would be available. The type of natural text answer provided in the signal ANS may be varied according to the design criteria of a particular implementation. Details of the signal QUERY and the signal ANS may be described in U.S. patent application Ser. No. 18/210,931, filed on Jun. 16, 2023, appropriate portions of which are incorporated by reference.

The rule module 304 may be configured to determine the criteria for a notification rule provided by the end user. In some embodiments, the rule module 304 may implement an artificial intelligence model for natural text parsing, natural text generation and/or searching. In some embodiments, the rule module 304 may implement a separate AI module from the AI module 270 described in association with FIG. 7. In some embodiments, an AI model may be implemented to determine the criteria of a notification rule and create and/or update a notification rule.

The rule module 304 may comprise a block (or circuit) 310 and/or a block (or circuit) 312. The circuit 310 may implement a large language model (LLM) AI module. The circuit 312 may implement a criteria module 312. The rule module 304 may comprise other components (not shown). The number, type and/or arrangement of the components of the rule module 304 may be varied according to the design criteria of a particular implementation.

The LLM AI module 310 may be configured to receive the notification rule criteria from the signal PRULE. The LLM AI module 310 may be configured to generate a signal (e.g., RULE). The signal RULE may be generated by the LLM AI module 310 in response to the signal PRULE. The LLM AI module 310 may present the signal RULE to the criteria module 312.

The LLM AI module 310 may be configured to parse the user input from the signal PRULE. The LLM AI module 310 may enable the user input to comprise a plain language description of the notification rule. The LLM AI module 310 may be configured to perform natural language processing on the criteria/rule based on the pattern and/or relationship between the words provided. For example, the LLM AI module 310 may enable a user experience that provides a conversational interaction, where the processor 102 provides video results and/or notifications as answers in response to the notification rules provided. In one example, the LLM AI module 310 may implement a ChatGPT AI model. In another example, the LLM AI module 310 may implement a Gemini AI model. The LLM AI module 310 may be configured to determine what the end user desires to receive notifications about. The LLM AI module 310 may parse the user input to determine the criteria of the notification rule provided by the end user. In response to determining the criteria of the notification rule, the LLM AI module 310 may generate the signal RULE. The signal RULE may comprise the criteria determined from the natural language input. For example, the LLM AI module 310 may translate the natural language input into computer readable information without restricting the user input to particular keywords and/or input formats.

The LLM AI module 310 may be configured to analyze each word input in the signal PRULE individually and/or together based on the order, arrangement and/or context of the input provided. The criteria generated may comprise more than merely a keyword. In one example, if the notification rule provided comprises "Let Alice take food from my cooler, but tell me when Bob does". The LLM AI module 310 may be configured to determine that the criteria is Bob taking food from the cooler. Merely finding Bob in the video may be insufficient, merely finding Alice taking food may be insufficient and merely finding any video with the cooler may be insufficient. The criteria may be interpreted together based on the relationship between the words and/or the word order to provide a notification only when Bob takes food from the cooler. The LLM AI module 310 may further determine constraints based on the input. For example, the criteria asked for 'Bob taking food from the cooler' and 'not Alice taking food'. Based on the usage of 'Bob' the LLM AI module 310 may determine that the video frame(s) with Bob eating food, or being given food from the cooler does not meet the criteria. The method of parsing and/or interpreting the meaning behind the criteria provided may be varied according to the design criteria of a particular implementation. Details of the LLM AI module 310 may be described in U.S. patent application Ser. No. 18/210,931, filed on Jun. 16, 2023, appropriate portions of which are incorporated by reference.

The criteria module 312 may be configured to receive the rule from the signal RULE and a signal (e.g., ITEM). The criteria module 312 may be configured to generate a signal (e.g., NOTR). The signal ITEM may comprise the items from the item inventory 284. The signal NOTR may be generated by the criteria module 312 in response to the signal RULE. The criteria module 312 may present the signal NOTR to the memory 150. The signal NOTR may comprise the notification rule for storage as part of the notification criteria 286. In some embodiments, the criteria module 312 may be part of the LLM AI module 310 (e.g., implemented as a single component in the rule module 304).

The criteria module 312 may be configured to compare the criteria generated by the LLM AI module 310 in the signal RULE with items in the item inventory 284. The criteria module 312 may be configured to find item(s) in the item inventory 284 that correspond to the criteria provided by the end user. The criteria provided may not necessarily have to fully match the items in the item inventory 284. For example, the items in the item inventory 284 may be fed into the criteria module 312 to determine if the criteria corresponds to any of the items detected. In some embodiments, the signal ANS may indicate that no item matching the criteria provided by the end user has been found. If no matching item has been found in the item inventory 284, the notification rule may still be created (e.g., a match may be found in the future when the item is located). The method of matching and/or determining whether the criteria corresponds to the items in the item inventory 284 may be varied according to the design criteria of a particular implementation.

The criteria module 312 may be configured to generate the signal NOTR in response to the criteria in the signal RULE and/or the items in the signal ITEM. The signal NOTR may be the notification rule created. The criteria module 312 may be configured to generate the notification rule from the data in the signal RULE in a format that may be stored in the notification criteria 286 and/or may be usable by the notification rule AI module 274. For example, the LLM AI module 310 may convert the plain language criteria into a sequence of information (e.g., extract the various information from the natural language input) and the criteria module 312 may convert the sequence of information into a format compatible with the notification criteria 286. The signal NOTR may be presented to the notification criteria 286 of the memory 150.

The video transcode module 306 may be configured to receive the signal VDATA. The video transcode module 306 may be configured to generate the signal VIDOUT. The signal VIDOUT may be generated by the video transcode module 306 in response to the signal VDATA. The video transcode module 306 may present the signal VIDOUT to the communication interface 254. In some embodiments, the signal VDATA may be generated for the signal NOTIFY. For example, part of the notification communicated to the user device 252 may comprise a video of the event detected that meets the criteria of the notification rule. Video data may not necessarily be communicated. For example, the notification rule may comprise a request for the video (e.g., a notification rule of "send me a video of anyone reaching into my truck").

The video transcode module 306 may be configured to prepare the video frames selected as part of the notification to be communicated to the user device 252. In one example, the video transcode module 306 may be configured to packetize the video results to be communicated by the communication interface 254. In some embodiments, the video transcode module 306 may be configured to transcode and/or encode the video frames into a particular format. Transcoding and/or encoding the video frames may reduce an amount of bandwidth used to communicate the signal VIDOUT. The transcoding and/or encoding of the video frames may enable the video results to be in an appropriate format to be viewed on the user device 252 (e.g., using an encoding format that may be decoded by the user device 252, using a resolution that is supported by the display of the user device 252, using a framerate that is supported by the user device 252, etc.).

The signal VIDOUT may be presented to the communication interface 254. In some embodiments, the signal VIDOUT and the signal ANS may be received by the communication interface 254. The communication interface 254 may generate the signal NOTIFY in response to the signal VIDOUT and/or the signal ANS. In some embodiments, the signal NOTIFY may comprise the transcoded video frames and/or the smart metadata describing the video data. In one example, the signal NOTIFY may comprise the video frames only. In another example, the signal NOTIFY may comprise the smart metadata describing the video frames only (e.g., to conserve bandwidth). In another example, the signal NOTIFY may comprise the video frames and the smart metadata to enable the smart metadata to be used as an answer to the query/request of the end user. The format of the signal NOTIFY may be varied according to the design criteria of a particular implementation.

The signal NOTIFY may be presented by the communication interface 254 to the user interface 302. The user interface 302 may display and/or output the video results and/or the natural text answer/description from the signal NOTIFY on the user device 252 as the signal NOTIFY.

In some embodiments, the processor 102 may implement four different AI models. In an example, the CNN module 190*b* (e.g., implemented by the video processing pipeline 260 and/or the detection module 262) may be one distinct AI model (e.g., a CNN) implemented to detect objects and/or behavior. In another example, the video-to-text AI module 272 may be one distinct AI model (e.g., a LLM) implemented to describe the visual content of the video frames and/or generate the smart metadata. In yet another example, the notification rule AI module 274 may be one distinct AI model (e.g., a CNN and/or a LLM) implemented to determine whether the video content matches the criteria of the notification rules and/or determine when to generate notifications. In still another example, the rule module 304 (or the LLM AI module 310) may be one distinct AI model (e.g., a LLM) implemented to understand the criteria for the notification rules and/or an answer to a query presented by the user. In some embodiments, all four of the AI models may be implemented locally by the processor 102. In some embodiments, the processor 102 may locally implement some of the AI models and other AI models may be off-loaded to cloud services. The number and/or types of AI models implemented to implement each feature may be varied according to the design criteria of a particular implementation.

Figure 9:
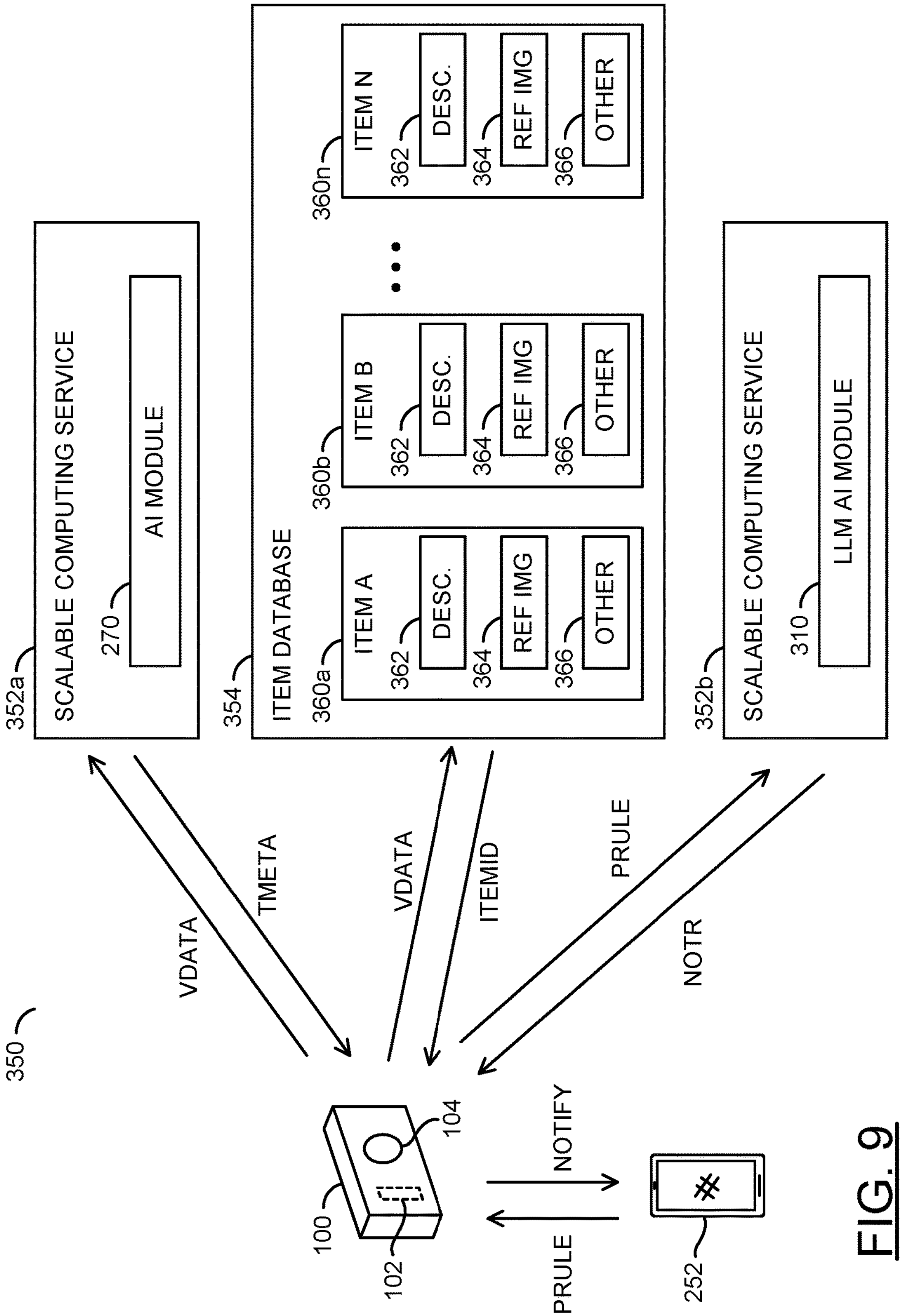
FIG. 9 is a diagram illustrating a camera communicating with cloud services implementing one or more AI models.

Referring to FIG. 9, a diagram illustrating a camera communicating with cloud services implementing one or more AI models is shown. A system 350 is shown. The system 350 may comprise the edge device 100, the user device 252, blocks (or circuits) 352*a*-352*b* and/or a block (or circuit) 354. The blocks 352*a*-352*b* may comprise scalable computing services. The block 354 may comprise an item database. The edge device 100 is shown comprising the processor 102 and/or the capture device 104. The system 350 may comprise other components (not shown). The number, type and/or arrangement of the components of the system 350 may be varied according to the design criteria of a particular implementation.

In the system 350, the user device 252 may provide the signal PRULE to the camera system 100. The processor 102 may not have the processing capability and/or the power budget to implement the video-to-text AI module 272, the notification rule AI module 274 and/or the LLM AI module 310. Instead of generating the smart metadata locally and/or parsing the criteria for the notification rules locally, the camera system 100 may offload the processing to the scalable computing services 352*a*-352*b*. Generally, the AI models implemented to perform the video-to-text and/or the language parsing may be computationally heavy. When the local processing capabilities of the edge devices 100*a*-100*n* are insufficient, the video data and/or the query may be sent to the scalable computing services 352*a*-352*b*.

The scalable computing services 352*a*-352*b* and/or the item database 354 may be configured to store data, retrieve and transmit stored data, process data and/or communicate with other devices (e.g., the camera system 100, the user device 252, etc.). The scalable computing services 352*a*-352*b* and/or the item database 354 may be implemented as part of a cloud computing platform (e.g., distributed computing). In an example, the scalable computing services 352*a*-352*b* and/or the item database 354 may be implemented as a group of cloud-based, scalable server computers. By implementing a number of scalable servers, additional resources (e.g., power, processing capability, memory, etc.) may be available to process and/or store variable amounts of data. For example, the scalable computing services 352*a*-352*b* and/or the item database 354 may be configured to scale (e.g., provision resources) based on demand. The scalable computing services 352*a*-352*b* and/or the item database 354 may implement scalable computing (e.g., cloud computing). The scalable computing may be available as a service to allow access to processing and/or storage resources without having to build infrastructure (e.g., the provider of the camera systems 100*a*-100*n* may not have to build the infrastructure of the scalable computing services 352*a*-352*b* and/or the item database 354). In some embodiments, a same cloud-services provider may provide both the scalable computing services 352*a*-352*b* and/or the item database 354. In some embodiments, different cloud-service providers may provide each of the scalable computing services 352*a*-352*b* and/or the item database 354.

The scalable computing service 352*a* may comprise the AI module 270. For example, the scalable computing service 352*a* may comprise the video-to-text AI module 272 and/or the notification rule AI module 274. The video-to-text AI module 272 implemented by the scalable computing service 352*a* may receive the video frames from the signal VDATA. The video-to-text AI module 272 may analyze the video frames to generate the smart metadata. The scalable computing service 352*a* may communicate the smart metadata via the signal TMETA. The smart metadata may be stored locally by the camera device 100 in the text metadata 282. In some embodiments, the scalable computing service 352*a* may comprise long-term storage for the video frames (e.g., in addition to and/or as an alternate to the video data storage 280). In some embodiments, the scalable computing service 352*a* may discard the video frames from the signal VDATA after the associated smart metadata is communicated back to the camera system 100.

The scalable computing service 352*b* may comprise the rule module 304 and/or the LLM AI module 310. The LLM AI module 310 implemented by the scalable computing service 352*b* may receive the notification rule criteria from the signal PRULE. The LLM AI module 310 may analyze the notification rule criteria to determine the criteria and/or the search results. The scalable computing service 352*b* may communicate the notification rule via the signal NOTR. The processor 102 may be configured to use the signal NOTR received from the scalable computing service 352*b* to detect whether the criteria of one or more notification rules has been met. In some embodiments, the scalable computing service 352*b* may comprise long-term storage for the video frames (e.g., in addition to and/or as an alternate to the video data storage 280) and/or the smart metadata (e.g., in addition to and/or as an alternate to the text metadata 282) and the analysis of video to detect the notification rule criteria may be performed by the scalable computing service 352*b*.

Based on the signal NOTR, the notification criteria 286 may be stored. For example, in response to analyzing the smart metadata based on the notification rules, the processor 102 may correlate the timestamps of the smart metadata that corresponds to the criteria of the notification rules with the timestamps of the video frames in the video data storage 280. The processor 102 may generate the signal VIDOUT (if part of the notification rule) and/or the notification signal NOTIFY. In some embodiments, with the rule module 304 implemented by the scalable computing service 352*b*, the scalable computing service 352*b* may provide the signal ANS comprising the natural text answer to the edge device 100. The signal NOTIFY may be presented to the user device 252. Generally, whether the video-to-text operations, the generation of the smart metadata, the parsing of the notification rule criteria, the determination of the criteria of the notification rule, the comparison of the criteria to the smart metadata and/or the video data analysis is performed locally by the processor 102 or offloaded to the scalable computing services 352*a*-352*b* may be transparent to the end user.

The item database 354 may be a remote server configured to store a database of items. The item database 354 may comprise a number of blocks (or circuits) 360*a*-360*n*. The blocks 360*a*-360*n* may represent item data stored in the item database 354. The item database 354 may receive the signal VDATA and/or generate a signal (e.g., ITEMID). The item database 354 may comprise other components and/or send/receive other signals (not shown). The number, type and/or arrangement of the components and/or signals of the item database 354 may be varied according to the design criteria of a particular implementation.

The item data 360*a*-360*n* may each comprise a block (or circuit) 362, a block (or circuit) 364 and/or a block (or circuit) 366. The block 362 may comprise item description storage. The block 364 may comprise reference image storage. The block 366 may comprise other data storage. The data stored in the item database 354 may be provided and/or managed by a third party service. In some embodiments, the item database 354 may be open source and/or open access (e.g., community managed). For example, volunteers may upload item images and/or descriptions of items to enable the item database 354 to store a large and robust amount of data about various items.

The item description storage 362 may comprise a text description of the various items in the item data 360*a*-360*n*. The reference images 364 may be used to identify the various items 76*a*-76*c* detected in the field of view 62. The other data 366 may comprise various other data types (e.g., item dimensions, item weight, item materials, other data that may not be discernable through video and/or vision alone, etc.). In one example, the camera system 100 may communicate the signal VDATA to the item database 354. The item database 354 may compare the objects in the signal VDATA with the reference images 364 of the item data 360*a*-360*n*. In response to the analysis of the objects in the signal VDATA and/or a comparison to the reference images 364 of the item data 360*a*-360*n*, the item database 354 may generate an item identification. The item identification may comprise an identity of the items 76*a*-76*c* and/or the text description 362 and/or other data 366 of the items 76*a*-76*c* detected in the signal VDATA. The item database 354 may communicate the signal ITEMID to the camera device 100. The signal ITEMID may comprise the identity of the items 76*a*-76*c* and/or the description of the items 76*a*-76*c*. The information in the signal ITEMID may be used to populate data for the item inventory 284.

Figure 10:
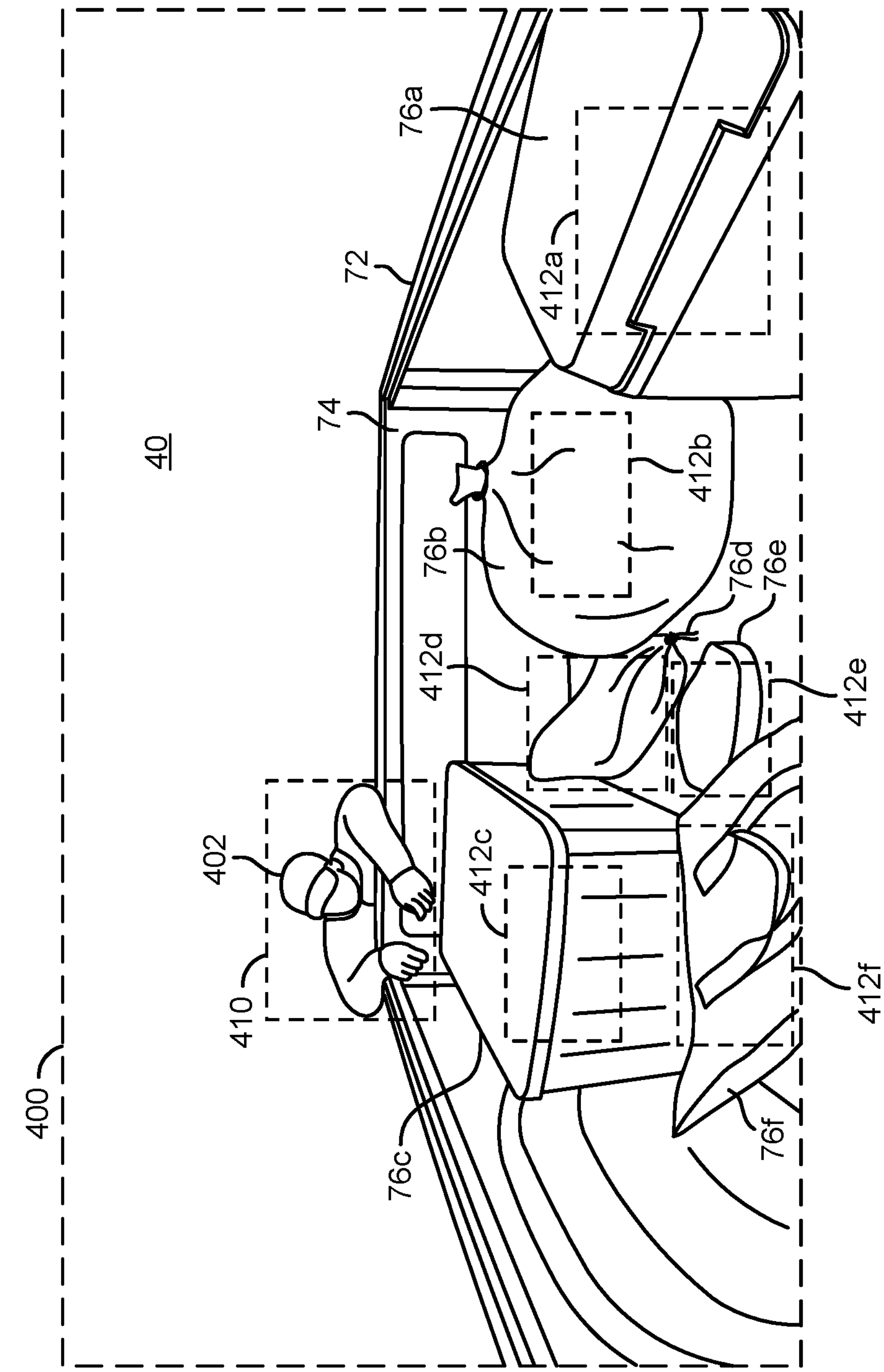
FIG. 10 is a diagram illustrating performing computer vision operations on a video frame to detect a theft.

Referring to FIG. 10, a diagram illustrating performing computer vision operations on a video frame to detect a theft is shown. An example video-to-text analysis of a video frame 400 is shown. The video frame 400 is shown. Generally, the video frame 400 may be part of the video data 280 stored in the memory 150 (e.g., before analysis by the video-to-text AI module 272, simultaneously with the analysis by the video-to-text AI module 272 or after analysis by the video-to-text AI module 272). A text description of the video frame 400 (e.g., smart metadata) may be stored in the text metadata storage 282. The video-to-text analysis of the video frame 400 may be performed by the video-to-text AI module 272 locally by the processor 102 and/or offloaded to the scalable computing service 352*a*.

The video frame 400 may be a representative example of the video data generated by the video processing pipeline 260 for analysis by the video-to-text AI module 272. In one example, the video frame 400 may represent the video frames provided in the signal VDATA. In another example, the video frame 400 may represent a subset of the video frames in the signal EFRM exacted by the video extraction module 264. The video frame 400 may be provided as input to the video-to-text AI module 272 for analysis. The video-to-text AI module 272 may generate the smart metadata entries in response to the analysis of the video frame 400.

The video data (or visual content) of the video frame 400 is shown as a representative example of video data captured from the camera system 100 through the rear window 70. While the video frame 400 is shown as human viewable visual content for illustrative purposes, the video-to-text AI module 272 may perform various operations on the pixel data and/or image blocks of the video frame 400. The video data of the video frame 400 may comprise the environment 40, the truck bed 72, the tailgate 74, the items 76*a*-76*f* and/or a person 402 captured in the field of view 62. The item 76*a* may be a cooler, the item 76*b* may be a garbage bag, the item 76*c* may be a bin, the item 76*d* may be a storage sack, the item 76*e* may be a container and the item 76*f* may be a satchel. Each of the items 76*a*-76*f* may be within the truck bed 72. The person 402 may be reaching over the tailgate 74 and into the truck bed 72.

Dotted shapes 410 and 412*a*-412*f* are shown in the video frame 400. The dotted shapes 410 and 412*a*-412*f* may represent the detection of an object/subject by the computer vision operations performed by the processor 102, the video-to-text AI module 272 and/or the notification rule AI module 274. The dotted shapes 410 and 412*a*-412*f* may each comprise the pixel data corresponding to an object detected by the computer vision operations pipeline, the neural network model 190*b*, the video-to-text AI module 272 and/or the notification rule AI module 274. In the example shown, the dotted shapes 410 and 412*a*-412*f* may be detected in response to animal detection, household object detection, interior object detection, person detection, vehicle detection, roadway detection, sky region detection, obstacle detection and/or exterior object detection (e.g., one or more of the neural network 190*b*, the video-to-text AI module 272 and/or the notification rule AI module 274 may comprise libraries configured to detect people, vehicles, objects, animals, etc.). The dotted shapes 410 and 412*a*-412*f* are shown for illustrative purposes. In an example, the dotted shapes 410 and 412*a*-412*f* may be visual representations of the object detection (e.g., the dotted shapes 410 and 412*a*-412*f* may not appear on an output video frame in the signal VIDOUT). In another example, the dotted shapes 410 and 412*a*-412*f* may be a bounding box generated by the processor 102 displayed on the output video frames to indicate that an object has been detected (e.g., the bounding boxes 410 and 412*a*-412*f* may be displayed in a debug mode of operation).

The computer vision operations, the notification rule analysis and/or the video-to-text operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 400 is shown, the behavior, movement direction and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 410 may be a region of interest of the person 402, and the bounding boxes 412*a*-412*f* may be respective regions of interest for the items 76*a*-76*f*. In an example, the settings (e.g., the feature set) for the processor 102 (e.g., the computer vision AI neural network model implemented by the CNN module 190*b*, the video-to-text AI module 272 and/or the notification rule AI module 274) may define objects of interest to be pets, people, storage objects, sporting equipment, tools, supplies, etc., For example, doorways, windows, ceilings, and/or stairs may not be objects of interest for a feature set defined to detect objects stored in or near a vehicle. In the example shown, the bounding boxes 410 and 412*a*-412*f* are shown having a square (or rectangular) shape. In some embodiments, the shape of the bounding boxes 410 and 412*a*-412*f* that correspond to the objects of interest detected may be formed to follow the shape of the body of the people detected and/or the shape of the furniture detected (e.g., an irregular shape that follows the curves and/or the body shape of the detected objects).

The processor 102, the CNN module 190*b*, the video-to-text AI module 272 and/or the notification rule AI module 274 may be configured to implement region, animal, object and/or face detection techniques. In some embodiments, other types of subjects as objects of interest may be detected (e.g., vehicles, moving objects, falling objects, etc.). The computer vision techniques and/or the video-to-text techniques may be configured to detect the regions of interest (ROIs) of the detected objects 410 and 412*a*-412*f* and/or generate the information about the detected objects 410 and 412*a*-412*f* and/or the context of the scene generally. For example, the bounding boxes 410 and 412*a*-412*f* may be a visual representation of the ROIs detected. The computer vision technique may be looped (e.g., to iteratively perform object/subject detection throughout the example video frame 400) in order to determine if any objects of interest (e.g., as defined by the feature set) are within the field of view 62 of the lens 160 and/or the image sensor 180.

While only the objects 410 and 412*a*-412*f* are shown as objects of interest, the computer vision operations and/or the video-to-text operations performed by the processor 102, the CNN module 190*b*, the video-to-text AI module 272 and/or the notification rule AI module 274 may be configured to detect background objects and/or other types of objects. The background objects may be detected for other computer vision purposes (e.g., training data, labeling, depth detection, etc.). The type(s) of subjects identified as the objects of interest 410 and 412*a*-412*f* may be varied according to the design criteria of a particular implementation.

The video-to-text AI module 272 may analyze the video frame 400 to generate the smart metadata that may describe the contents of the video data. The notification rule AI module 274 may analyze the video frame 400 to determine whether the notification criteria 286 has been met for generating a notification. In one example, if one of the notification rules comprises detecting the person 402 (a specific person identified using facial recognition operations or any person) approaching the truck bed 72, then the notification rule AI module 274 may determine that the object 410 comprising the person 402 is located near the truck bed 72, which meets the criteria for a notification rule for sending a text alert, and the signal CTHRESH may be generated to enable the notification. In another example, the notification rule AI module 274 may detect that the behavior of the person 402 comprises reaching into the truck bed 72, which meets the criteria for a notification rule for sending an audio notification when a person is detected attempting to take one of the items 76*a*-76*f* from the truck bed 72. In another example, if facial recognition detects the person 402 as the vehicle owner, and the notification rules indicate that no notification is generated when the vehicle owner reaches into the truck bed 72, then the criteria for sending a notification may not be met and no notification may be sent. The notification rule analysis may be performed independent from the video-to-text analysis. The notification rule analysis may be performed in parallel with the video-to-text analysis. The notification rule analysis may be performed after the video-to-text analysis on the natural text description generated about the video frame 400.

In some embodiments, the notification rules may be applied specifically to individual items 76*a*-76*f*. In the example shown, the person 402 may be reaching for the bin 76*c* (e.g., a storage bin for expensive tools). Since the end user may want to ensure the expensive tools in the bin 76*c* are safe, the end user may set for a video alert and for a vehicle alarm to be generated as part of the notification rule when someone attempts to take the bin 76*c* (e.g., to provide video evidence of a theft and to deter the theft). In another example, if the person 402 were reaching for the garbage bag 76*b* (e.g., junk that the end user planned to throw away), the end user may not set a notification rule for the garbage bag 76*b*. In some embodiments, even though no notification may be generated for the garbage bag 76*b*, the particular frame IDs and/or timestamp may be recorded to indicate that an event has occurred. For example, the end user may have an option to query the LLM AI module 310 with general questions (e.g., the end user may provide a query of "Where did the garbage bag go?" and the signal ANS may provide a response of "A stranger took the garbage bag on Monday at 3 am, here is a video of the event"). The types of notification rules applied to the various items 76*a*-76*f* may be varied according to the design criteria of a particular implementation.

The smart metadata entries may be generated by the video-to-text AI module 272. The smart metadata entries may correspond to each of the video frames. For example, the video-to-text AI module 272 may generate one smart metadata entry for the video frame 400 and other smart metadata entries for each one of the video frames captured. The smart metadata that describes the contents of the video frames may be stored in the text metadata 282. In some embodiments, the notification rule AI module 274 may analyze the text metadata 282 to compare with the notification criteria 286 instead of analyzing the video data 280 directly. The smart metadata entries may comprise frame ID entries (e.g., to identify the particular video frames that the smart metadata corresponds to), a natural language description (e.g., describing the general contents of the video frames and/or the people and items detected) and/or event descriptions (e.g., a description of what the people and/or items detected have been detected as doing in the video frames). The number, type and/or information stored as the smart metadata may be varied according to the design criteria of a particular implementation. Details of the smart metadata may be described in association with U.S. patent application Ser. No. 18/210,931, filed on Jun. 16, 2023, appropriate portions of which are incorporated by reference.

When the notification rule analysis is performed, the smart metadata entries may be analyzed by the notification rule AI module 274 to determine if the text description corresponds to the criteria of the notification rules. The natural language description and/or the event descriptions may be searched to determine whether the smart metadata entries correspond to the criteria of the notification rule(s). In some embodiments, the smart metadata may comprise a camera ID to indicate which of the cameras 100*a*-100*d* detected the criteria. When the criteria is determined to meet the notification threshold for a notification rule by the notification rule AI module 274, then the notification rule AI module 274 may generate the signal CTHRESH to enable the signal NOTIFY to be presented to the user device 252.

Figure 11:
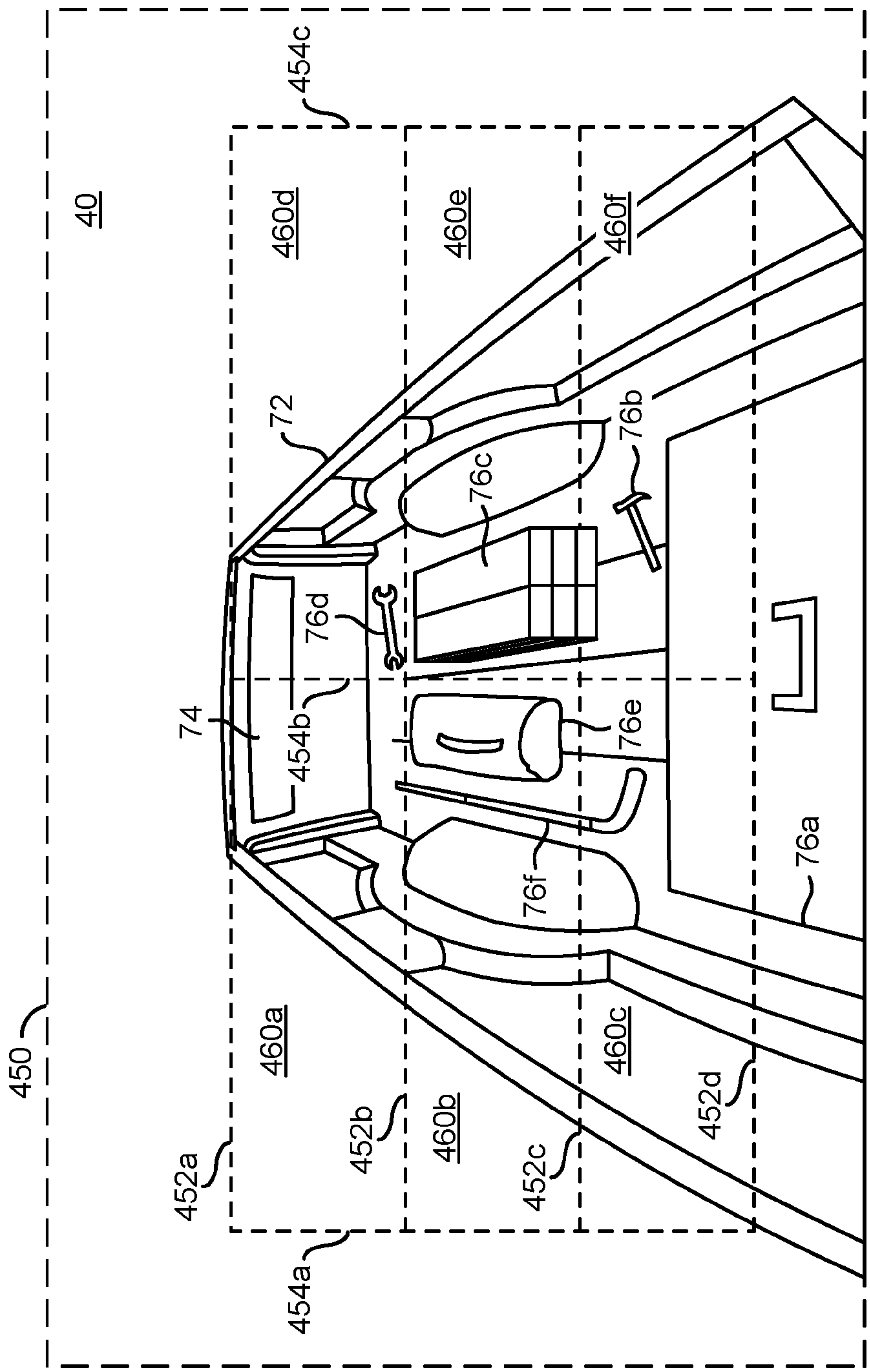
FIG. 11 is a diagram illustrating performing computer vision operations on a video frame to generate an inventory of items.

Referring to FIG. 11, a diagram illustrating performing computer vision operations on a video frame to generate an inventory of items is shown. The video frame 450 may comprise a view of the environment 40 through the rear window 70 of the pickup truck 50. The field of view 62 captured in the video frame 450 may comprise the truck bed 72, the tailgate 74 and/or the items 76*a*-76*f*. In the video frame 450, the item 76*a* may be a toolbox, the item 76*b* may be a hammer, the item 76*c* may be a stack of lumber, the item 76*d* may be a wrench, the item 74*e* may be a sports bag, and the item 74*f* may be a hockey stick. Each of the items 74*a*-74*f* may be detected as objects by the computer vision operations and/or described in natural language text by the video-to-text AI module 272.

Horizontal dashed lines 452*a*-452*d* and vertical dashed lines 454*a*-454*c* are shown overlaid on the truck bed 72. The horizontal dashed lines 452*a*-452*d* and the vertical dashed lines 454*a*-454*c* may form a grid pattern. The grid pattern may comprise regions (or cells) 460*a*-460*f*. The regions 460*a*-460*f* may represent locations of the field of view 62 and/or regions of the truck bed 72. The location regions 460*a*-460*f* are shown using the horizontal dashed lines 452*a*-452*d* and the vertical dashed lines 454*a*-454*c* for illustrative purposes (e.g., generally, the location regions 460*a*-460*f* may not be visible on the output video frames). In the example shown, the truck bed 72 may be divided into the six location regions 460*a*-460*f*. In some embodiments, the location regions of the truck bed 72 and/or the field of view 62 may be divided into more regions (e.g., higher location granularity) or fewer regions (e.g., less location granularity). The number of the location regions 460*a*-460*f* may be varied according to the design criteria of a particular implementation.

The location regions 460*a*-460*f* may be used to provide location information for the items 76*a*-76*f* in the item inventory 284. Each of the items 76*a*-76*f* may be detected in one or more of the location regions 460*a*-460*f*. In the example shown, the toolbox 76*a* may be detected in the location 460*c* and the location region 460*f*, the hammer 76*b* may be detected in the location region 460*f*, the lumber 76*c* may be detected in the location region 460*e*, the wrench 76*d* may be detected in the region 460*d*, the sports bag 76*e* may be detected in the location region 460*b* and the hockey stick 76*f* may be detected in the location regions 460*a*-460*c*. The location region(s) may be stored with the item description for each of the items 76*a*-76*f* in the item inventory 284. For example, the item 76*f* may be stored in the item inventory 284 with a description of a hockey stick and location regions 460*a*-460*c*.

In some embodiments, the location regions 460*a*-460*f* that may be stored with the items 76*a*-76*f* in the item inventory 284 may change over time. For example, the hammer 76*b* may have originally been placed in the truck bed 72 in the location region 460*b*. However, as the vehicle 50 moves (or as the vehicle owner moves items in the truck bed 72) the hammer 76*b* may move into another location region (e.g., the location region 460*f*). The item inventory 284 may be updated to store the new location of the hammer 76*b*. In some embodiments, the item inventory 284 may store an original location (e.g., where the item was first detected) and a current location. In some embodiments, the item inventory 284 may store a last known location of an item (e.g., if the hammer 76*b* slides under the sports bag 76*e* and is no longer visible, the last known location may be the location region 460*b*). In some embodiments, the item inventory 284 may store multiple location region entries to track the location of a particular item over time). The amount of location information stored in the item inventory 284 may be varied according to the design criteria of a particular implementation.

In some embodiments, the LLM AI module 310 may be configured to parse plain language questions about the locations of items. The signal ANS may provide a response to the question. For example, the rule module 304 may query the item inventory 284 to retrieve the item and the location region associated with the item. For example, the end user may provide a question of "Did I leave my hammer in the truck?" in the signal PRULE and the rule module 304 may detect if the hammer is in the item inventory 284. If the hammer is not detected, the signal ANS may provide a response of "No.". If the hammer is detected, the location region may be retrieved and the signal ANS may provide a response of "Yes, the hammer is located in the truck bed on the right side near the rear window. It's next to the toolbox".

Figure 12:
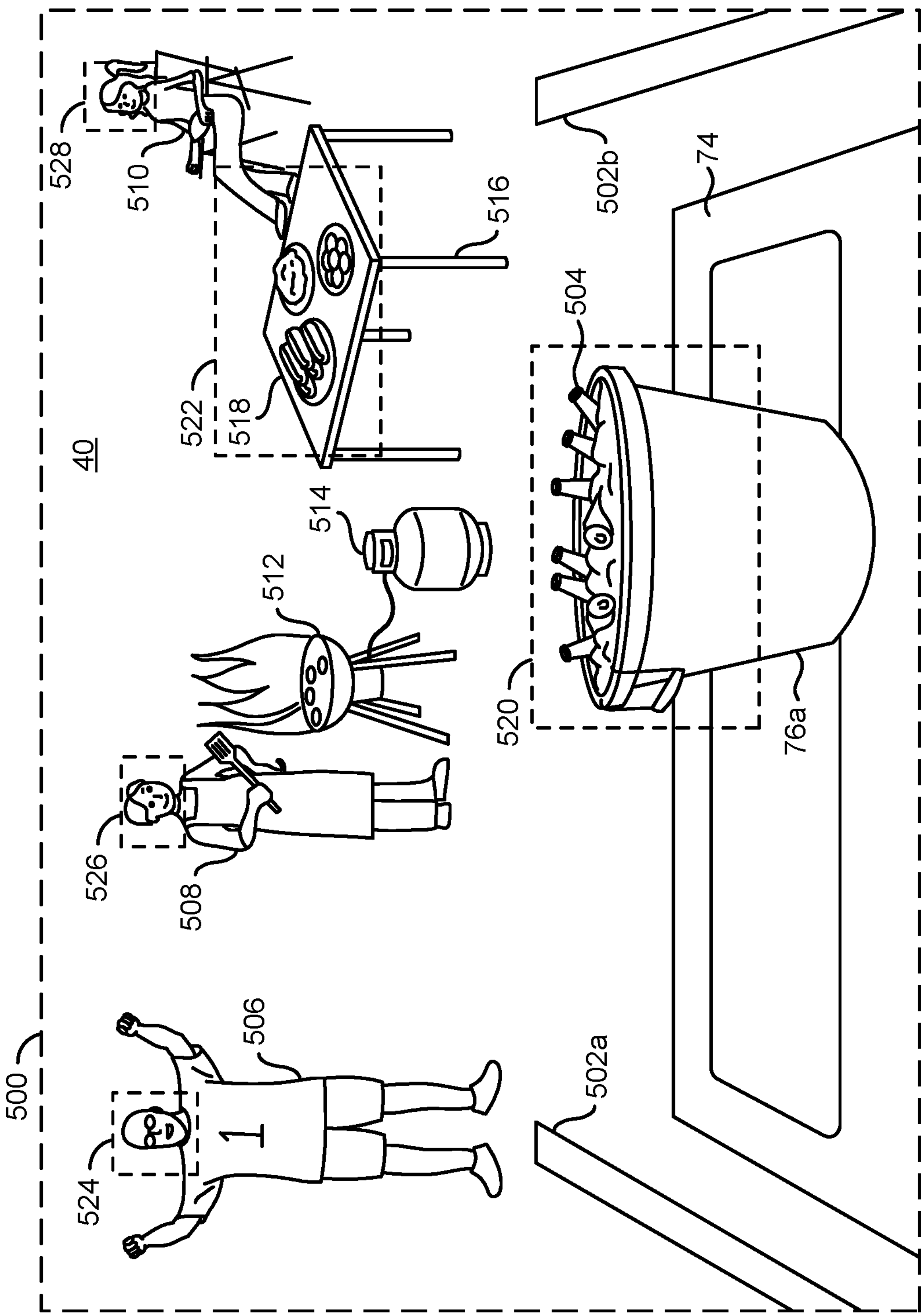
FIG. 12 is a diagram illustrating performing computer vision operations on a video frame of a tailgate party.

Referring to FIG. 12, a diagram illustrating performing computer vision operations on a video frame of a tailgate party is shown. The video frame 500 may comprise a view of the environment 40. The field of view 62 captured in the video frame 500 may comprise the tailgate 74 in an opened state and/or an item 76*a*. In the video frame 500, the item 76*a* may be a cooler tub. In the example shown, the video data may be captured by the camera system 100 configured to capture the video data through the rear window 70. In some embodiments, the vehicle 50 may be hatchback (usually the tailgate is left open during a tailgate party), and the camera system 100 may be implemented at a bottom of the trunk door to enable the field of view 62 to capture outwards into the environment 40.

The video frame 500 may further comprise parking lines 502*a*-502*b*. For example, the vehicle 50 may be parked in a parking lot for a tailgate party. The video frame 500 may comprise drinks 504 in the cooler tub 76*a*. The video frame 500 may further comprise people 506-510, a barbeque 512, a propane tank 514, a table 516 and/or snacks 518. In an example, the person 506 may be a random partier (e.g., unknown to the user), the person 508 may be the user, and the person 510 may be a friend of the user. In the example scenario shown in the video frame 500, the user 508 may be hosting a tailgate party near the vehicle 50, with drinks 504 in the cooler tub 76*a* resting on the tailgate 74 and snacks 518 on the table 516. The user 508 may be preparing food on the barbeque 512 for the friend 510. The barbeque 512, the propane tank 514, the table 516 and/or the snacks 518 may be the items 76*a*-76*n* in the item inventory 284. For example, the items 512-518 may have been stored in the truck bed 72 and then unloaded for the tailgate party.

Dotted boxes 520 and 522 are shown. The dotted boxes 520-522 may represent the object detection performed in response to the computer vision operations. The dotted box 520 may be a bounding box for the cooler tub 76*a* and/or the drinks 504. The dotted box 522 may be a bounding box for the snacks 518. The dotted boxes 520-522 may be representative examples of the AI module 270 detecting objects for generating a plain text description of the video frame 500 and/or for comparing the content of the video data to the notification criteria 286. In another example, the dotted boxes 520-522 may represent items detected that may be added to the item inventory 284. While the dotted boxes 520-522 are shown as representative examples of items detected, other items may further be detected and/or added to the item inventory 284 (e.g., the barbeque 512, the propane tank 514, a chair, etc.).

Dotted boxes 524-528 are shown. The dotted boxes 524-528 may represent facial recognition and/or facial detection performed in response to the computer vision operations. The dotted box 524 may correspond to a detected face of the random partier 506, the dotted box 526 may correspond to a detected face of the user 508 and the dotted box 528 may correspond to a detected face of the friend 510. The detected faces 524-528 may be used by the AI module 270 (e.g., the video-to-text AI module 272) to generate the text metadata 282 for the video frame 500. In some embodiments, the detected faces 524-528 may be compared to faces stored in the item inventory 284 (e.g., faces may be treated similarly to the items 76*a*-76*f*). The detected faces 524-528 may be used by the AI module 270 (e.g., the notification rule AI module 274) to determine whether the notification criteria 286 has been met. In some embodiments, the memory 150 may store a number of known faces as reference images for identifying detected people as a specific person. For example, the detected faces 524-528 may be compared to reference images and/or a feature set generated from the reference images in order to perform the facial recognition operations. In the example shown, the detected face 524 may be an unknown face (e.g., a stranger that has not been previously identified), the detected face 524 may be a face of the user (e.g., a person named Bob), and the detected face 524 may be a face of a friend (e.g., an approved person named Alice).

The AI module 270 may be configured to generate the text metadata 282 for the video frame 500 and/or a sequence of video frames that includes the video frame 500. In one example, the text metadata 282 may comprise a full sentence description of "The vehicle is parked in a parking lot with the tailgate open. The cooler is sitting on the tailgate and contains 6 bottles and 2 cans on ice. Bob is grilling food on the barbeque behind the truck. The barbeque is connected to the propane tank. The barbeque grill is smoking and 4 burgers are on the grill. Alice is sitting near the table in a chair. Burgers, hot dogs and condiments are on the table. An unknown person is cheering and approaching the vehicle." In another example, the text metadata 282 may comprise bullet point descriptions such as "—Vehicle: parked, —tailgate: open, —item 1: cooler, located on tailgate, —items 2-7: bottles located in cooler, —items 8-9, cans located in cooler, —item 10: barbeque located on ground 10 ft behind vehicle, —item 11: propane tank located on ground 9 ft behind vehicle, —item 12: table located behind and to the right 10 ft away, —items 13-20: burgers located on table, —items 21-25: hot dogs located on table, —person 1: unknown approaching vehicle and Bob, —person 2: Bob located 10 ft behind vehicle next to barbeque, —person 3: Alice located 15 ft behind vehicle to the left, sitting in chair, etc". The particular text and/or descriptive language used to describe the detected items 520-522, the detected people 524-528, other people, other objects, the vehicle 50 and/or the environment 40 may be varied according to the design criteria of a particular implementation.

The AI module 270 may be configured to compare the notification criteria 286 to the text metadata 282 associated with the video frame 500. In one example, the notification criteria 286 may comprise "Send me an audio alert if someone other than Bob and Alice takes a drink from the cooler". In the video frame 500 (and subsequent video frames), if the random partier 506 is detected stealing a drink from the cooler tub 76*a*, then the signal NOTIFY may be generated to enable the user device 252 to provide an audio alert. In another example, if the user 508 or the friend 510 are detected taking a drink from the cooler tub 76*a*, then no alert may be generated. In yet another example, the notification criteria 286 may comprise "Send me a notification when the food on the table runs out". In the video frame 500 (and subsequent video frames) the AI module 270 may monitor the snacks 518 to determine whether there is still food on the table 516. In still another example, the notification criteria may be, "Send me a loud alert when a child is near the grill". The AI module 270 may be configured to associate a similar item (e.g., the barbeque 512) with the criteria language of "grill". The AI module 270 may be configured to determine an age range of the people in the video frame (and subsequent video frames) to determine whether children are approaching the barbeque 512.

In some embodiments, the user may set time limitations on the notification criteria 286. The time limitations may be used to resolve potential conflicts between the notification criteria 286. For example, the user may set criteria for one notification rule that generates an alert when people other than Bob or Alice take the snacks 518. The user may set criteria for another notification rule that prevents alerts when anyone takes the snacks 518 after 3 μm. The notification rule for generating notifications for taking the snacks may be in conflict with the other notification rule for not generating notifications based on the time. For example, the user may want friends to have the food, but near the end of the tailgate party, the user may prefer to prevent food waste and let anyone take the snacks 518. The rule with additional specificity (e.g., a time limitations) may over-ride the rule with less specificity.

Figure 13:
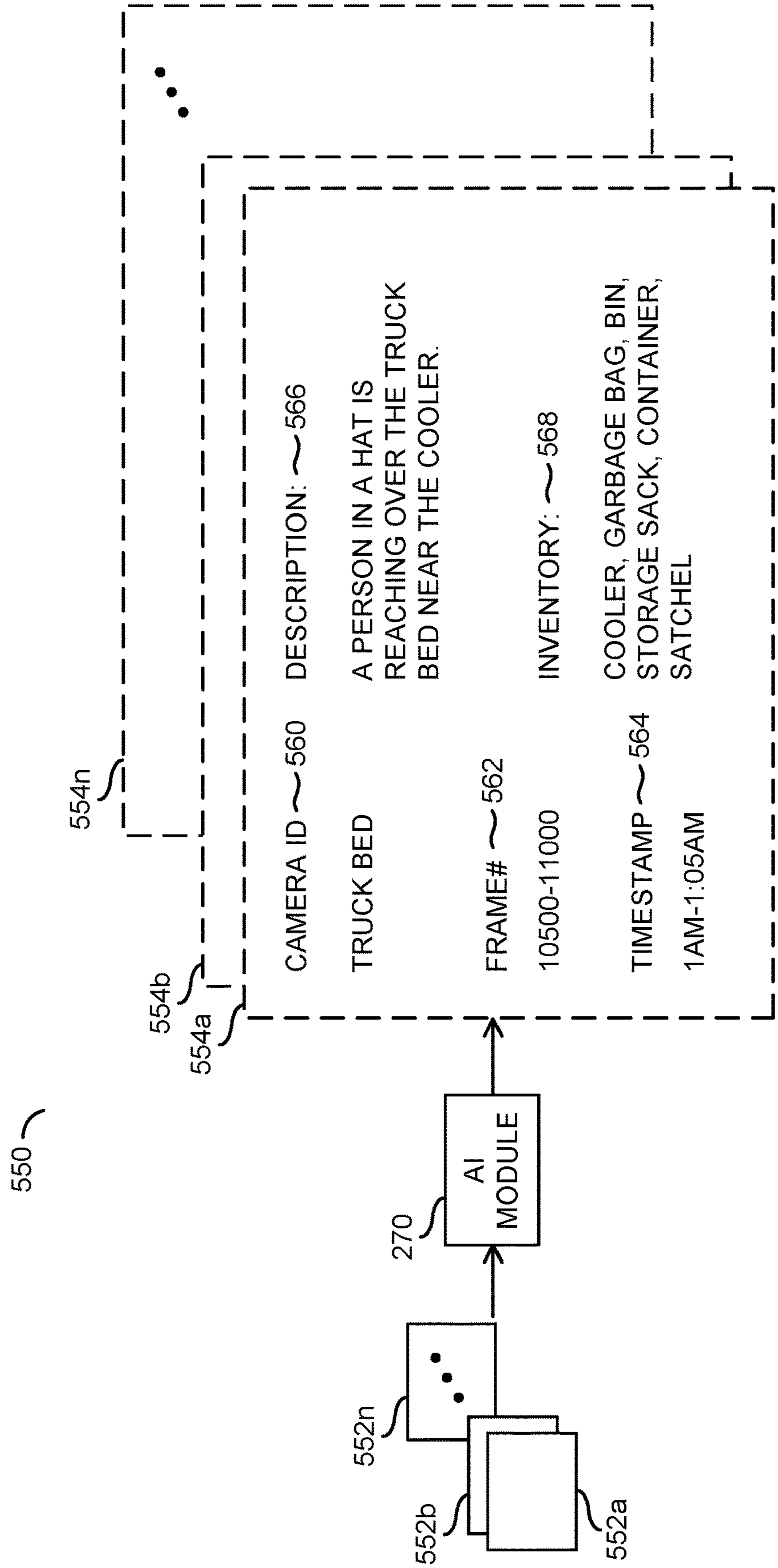
FIG. 13 is a diagram illustrating smart metadata.

Referring to FIG. 13, a diagram illustrating smart metadata is shown. A smart metadata representation 550 is shown. The smart metadata representation 550 may comprise the AI module 270, a number of video frames 552*a*-552*n* and/or a number of smart metadata entries 554*a*-554*n*. The video frames 552*a*-552*n* may be processed in the video processing pipeline 260 and/or stored as the video data 280 of the memory 150. The smart metadata entries 554*a*-554*n* may be generated by the video-to-text AI module 272 and/or stored in the text metadata 282 and/or the item inventory 284 of the memory 150.

In the example shown, the number of the smart metadata entries 554*a*-554*n* may be the same as the number of the video frames 552*a*-552*n*. For example, the video-to-text AI module 272 may store a smart metadata entry for each of the video frames. In some embodiments, one of the smart metadata entries 554*a*-554*n* may provide the text description for a sequence of the video frames. For example, there may be fewer of the smart metadata entries 554*a*-554*n* than the number of the video frames 552*a*-552*n*. In one example, the detection module 262 may perform an initial layer of detection (e.g., relatively low computational resources) to determine the overall status of the video frames 552*a*-552*n* and/or the amount of change from video frame to video frame. For example, if one video frame is substantially similar to the previous video frame, the video-to-text AI module 272 may not generate the text description and the previous description may be re-used in order to conserve resources. The particular number of the smart metadata entries 554*a*-554*n* generated compared to the number of the video frames 552*a*-552*n* and/or the particular criteria used to generate the smart metadata entries 554*a*-554*n* may be varied according to the design criteria of a particular implementation.

The smart metadata entries 554*a*-544*n* may be generated by the AI module 270 and/or the video-to-text AI module 272. The smart metadata entry 554*a* is shown as a representative example of the smart metadata entries 554*a*-554*n*. The smart metadata entry 544*a* may comprise the data entries 560-568. The smart metadata entries 554*a*-554*n* may comprise other information (not shown). The number, type and/or information stored as the smart metadata may be varied according to the design criteria of a particular implementation.

The data entries 560-564 may comprise frame ID entries, the data entry 566 may comprise a frame description, and the data entry 568 may comprise the items detected. The frame ID entries 560-564 may provide information that may be used to describe the edge devices 100*a*-100*n* and/or correlate the smart metadata entries 554*a*-554*n* to one of the video frames 552*a*-552*n*. The frame ID entry 560 may comprise a camera ID. The camera ID 560 may indicate which of the edge devices 100*a*-100*n* captured the correlated one of the video frames 552*a*-552*n*. In the example shown, the camera ID 560 may be 'truck bed' (e.g., indicating the location of the edge device 100). In some embodiments, the camera ID 560 may be an alphanumerical product identifier. In some embodiments, the camera ID 560 may be tied to a user account (e.g., indicating the owner of the edge device 100). In some embodiments, the camera ID 560 may be a user customizable name (e.g., the end user may have selected 'truck bed' to indicate where the edge device 100 is installed). The camera ID 560 may enable search results to indicate where the video results were captured (e.g., the end user may provide a query that asks for events that happened in the truck bed).

The frame ID entry 562 may comprise video frame numbers. The frame ID entry 564 may comprise a timestamp range. The frame ID entries 562-564 may indicate when the video frames were captured. The frame ID entries 562-564 may enable the smart metadata entries 554*a*-554*n* to be matched to a corresponding timestamp and/or frame ID of the video frames 552*a*-552*n* and/or sensor data for sensor fusion operations. For example, each of the video frames 552*a*-552*n* in the video data storage 280 may comprise a timestamp and/or a frame ID number. In some embodiments, the frame numbers 562 and/or the timestamp 564 may comprise a single value (e.g., each video frame may be a particular frame number and/or be captured at one particular time). In some embodiments, one of the smart metadata entries 554*a*-554*n* may correspond to multiple of the video frames 552*a*-552*n*. For example, the video content may not necessarily change significantly from frame to frame (e.g., the scene may be generally static). For example, if the vehicle 50 is parked at night and no people approach the vehicle 50, generating one of the smart metadata entries 554*a*-554*n* for each of the video frames 552*a*-552*n* may not provide additional benefit (e.g., the same natural text description may be applicable to a large number of video frames 552*a*-552*n*). The frame ID entries 562-564 may comprise a range of entries (e.g., a start time and an end time) when the smart metadata corresponds to a sequence of the video frames 552*a*-552*n*.

The natural language description 566 may comprise the text description of the visual contents of the corresponding video frames 552*a*-552*n*. The video-to-text AI module 272 may generate the natural language description 566 in response to analyzing the video frames 552*a*-552*n*. In the example shown, the natural description 566 may comprise descriptions of what is happening in the video frame. For example, the example video frame 400 shown in association with FIG. 10 may be described. The detected person 410 may be detected reaching into the truck bed 72. Based on the behavior of the detected person 410, the AI module 270 may infer that the detected person 410 is reaching for the detected item 412*c* (e.g., the container) in the truck bed 72. Since the identification of the detected person 410 may be unknown a description may be provided (e.g., wearing a hat, the color of the hat, a color of a shirt, a shirt type, etc.). The type of text description generated may be varied according to the visual content in the video frame, the AI model implemented and/or the design criteria of a particular implementation.

The natural text description 566 may comprise human readable text. In one example, the natural text description 566 may comprise full sentences in a particular human language. For example, the natural text description 566 may comprise "A person in a hat is reaching over the truck bed near the cooler". In another example the natural text description 566 may comprise bullet points in a particular human language. For example, the natural text description 566 may comprise "Person reaching into truck. Early afternoon. No items missing.". The natural text description 566 may provide a full description of the visual content of the video frames 552*a*-552*n* similar to the way that a person would describe the video frames 552*a*-552*n*. The natural text description 566 generated may comprise a sufficient amount of description and/or detail to enable the notification rule AI module 274 to analyze the natural text description 566 without having to perform computer vision analysis on the video frames 552*a*-552*n*. In some embodiments, the video frames 552*a*-552*n* may be discarded (e.g., to preserve privacy, to enable the memory 150 to store other data instead, etc.) after the natural text description 566 is generated.

The inventory items 568 may comprise a list of the items 76*a*-76*n* detected in the associated video frames 552*a*-552*n*. The inventory items 568 may be used to provide the data for the item inventory 284. In the example shown, the inventory items 568 may enumerate the items 76*a*-76*n* (e.g., "cooler, garbage bag, bin, storage sack, container, satchel"). The inventory items 568 may further comprise a description of the location that the particular items 76*a*-76*n* have been detected. For example, storing the location of the items detected in the smart metadata entries 554*a*-554*n* may enable the tracking of the items 76*a*-76*n* over time. In some embodiments, the item inventory 284 may store a latest known location of the items 76*a*-76*n*, while the inventory items 568 may provide additional details of the movement of the items 76*a*-76*n* over time, may provide when an item was first detected, when the item was removed, etc. The particular information stored in the inventory items 568 may be varied according to the design criteria of a particular implementation.

Figure 14:
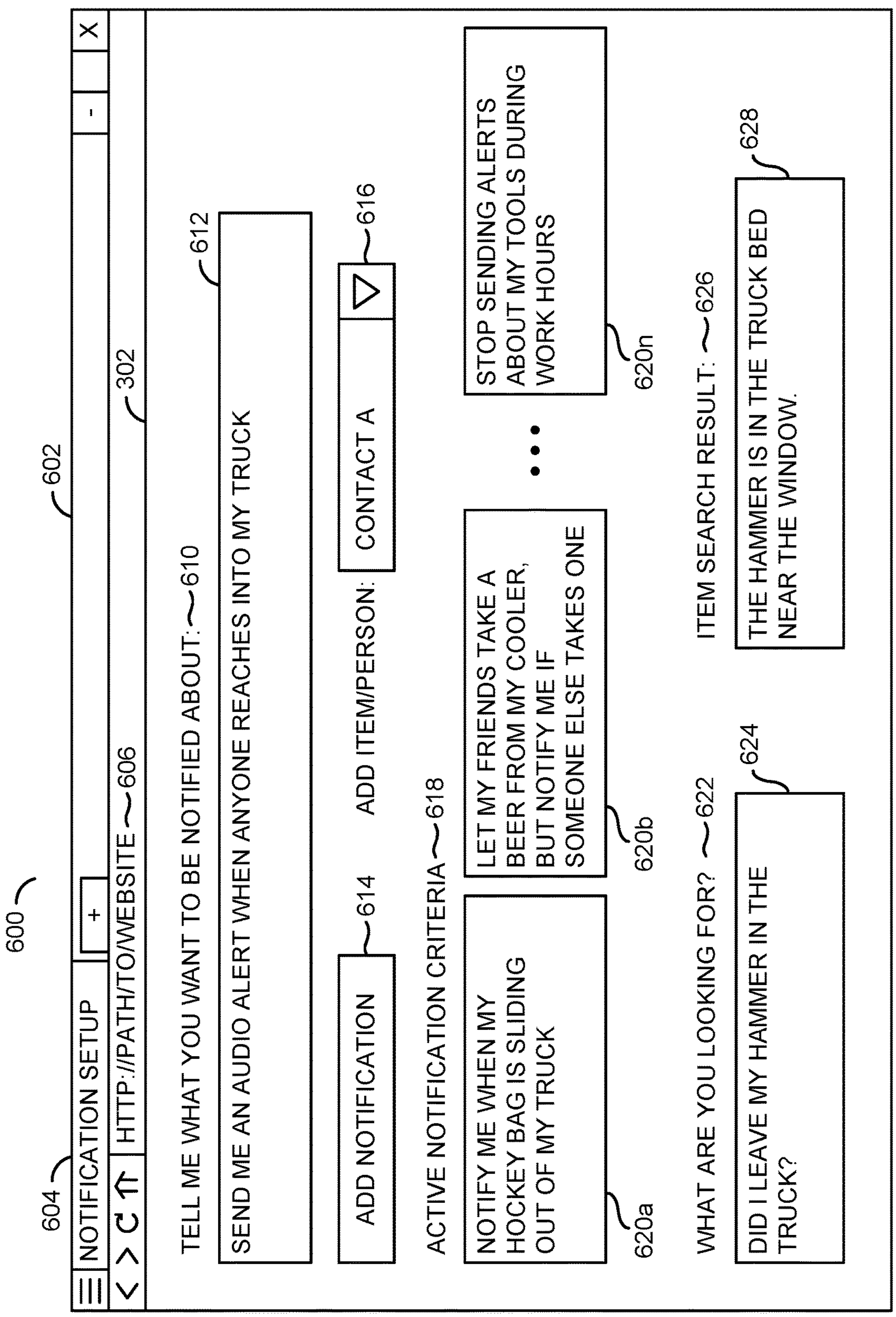
FIG. 14 is a diagram illustrating an interface for notification rule criteria.

Referring to FIG. 14, a diagram illustrating an interface for notification rule criteria is shown. An interface 600 is shown. In some embodiments, the interface 600 may be a GUI of the user interface 302 implemented by a companion app for the edge devices 100*a*-100*n* installed on the user device 252. In the example shown, the interface 600 may be a web-based implementation of the user interface 302 viewable using the user device 252. The interface 600 may be generated in response to the UI data 288. The interface 600 may comprise a browser window 602, a browser tab 604, a URL link 606 and the user interface 302. For example, the end user may load the browser tab 604 to the URL link 606 associated with the edge devices 100*a*-100*n* and/or the scalable computing services 352*a*-352*b* to load the user interface 302.

The user interface 302 may comprise a prompt 610, an input box 612, a button 614, a dropdown input selection 616, a heading 618, textboxes 620*a*-620*n*, a prompt 622, an input box 624, a heading 626 and/or a search result 628. The prompt 610 may implement an input prompt. The input box 612 may implement a notification rule input. The button 614 may implement a notification rule submission button. The dropdown input selection 616 may implement an input for adding people and/or items to the notification rule input. The heading 618 may implement a notification rule list heading. The textboxes 620*a*-620*n* may implement a notification rule display. The prompt 622 may implement a search input heading. The input box 624 may implement an inventory search query input. The heading 626 may implement a search result heading. The search result 628 may implement an output of the search result.

The prompt 610 may indicate that the end user may enter the notification rule text in the notification rule input 612. The end user may provide a natural text description of the criteria for a new notification rule in the notification rule input 612. The end user may submit the new notification rule using the notification rule submission button 614. The dropdown input selection 616 may enable the end user to select from a pre-populated list of known people and/or items. For example, the memory 150 and/or the item inventory 284 may store reference images and/or feature sets for facial recognition that may be associated with a name and/or the items detected. In one example, the reference images may be extracted from a contact photo on the user device 252 (e.g., a photo captured by a camera of a smartphone). For example, the dropdown input selection 616 may comprise an entry for "Alice" and "Bob" to enable the notification rule to apply to the people 508-510 shown in association with FIG. 12. In another example, the dropdown input selection 616 may comprise entries for "hammer", "wrench", "lumber" "toolbox", "sports bag", "hockey stick", etc. to apply for the items 76*a*-76*f* shown in association with FIG. 11. Using the dropdown input selection 616, the notification rules created may have criteria that apply only to specific people and/or specific items. In some embodiments, instead of a dropdown menu, the specific people and/or items from the item inventory 284 may be determined from the text input of the notification rule input 612 alone.

The notification rule input 612 may comprise criteria for the notification criteria 286. In the example shown, the notification rule input 612 may be plain language input by the end user. The input prompt 610 may provide context for submitting the notification rule criteria. In the example shown, the input prompt 610 may state "Tell me what you want to be notified about", indicating that the end user may provide natural language descriptions and/or requests, as if speaking to a person. In the example shown, the notification rule input 612 may be the criteria "Send me an audio alert when anyone reaches into my truck". The input prompt 610 and the notification rule input 612 may provide context to enable the LLM AI module 310 to generate accurate and/or relevant criteria and/or rules. The type of language input and/or the particular criteria elements required to create a notification rule (e.g., a person, an item, a type of alert, etc.) may be varied according to the design criteria of a particular implementation.

In response to the end user interacting with the notification rule submission button 614, the criteria may be sent to the LLM AI module 310 via the signal PRULE. The LLM AI module 310 may determine the criteria for the rule in response to the notification rule input 612 and/or pre-identified people from the dropdown input selection 616. The rule module 304 comprising the LLM AI module 310 and/or the criteria module 312 may be configured to parse the notification rule input 612 and determine the criteria for the notification rule. The signal NOTR may be generated comprising the notification rule.

The notification rule list heading 618 may indicate for the end user the notification rules that have already been created and/or that are active. The notification rule displays 620*a*-620*n* may comprise the active and/or already created notification rules stored in the notification criteria 286. In an example, data from the notification criteria 286 may be communicated with the signal UI to generate the user interface 302. Example notification rules displays 620*a*-620*n* are shown. In the example shown, the notification rule display 620*a* may comprise "Notify me when my hockey bag is sliding out of my truck", the notification rule display 620*b* may comprise "Let my friends take a beer from my cooler, but notify me if someone else takes one" and the notification display 620*n* may comprise "Stop sending alerts about my tools during work hours". The number of notification rule displays 620*a*-620*n* shown and/or the particular criteria for the notification rule displays 620*a*-620*n* may depend on the input provided by the end user.

The search input heading 622 may indicate that the end user may enter the inventory search text in the inventory search query input 624. The end user may provide a plain text description of the item that is being searched for (e.g., one of the items 76*a*-76*n*). In the example shown, the inventory search query input 624 may be, "Did I leave my hammer in the truck?". The processor 102 may search the item inventory 284 in response to providing the plain text description of the item in the inventory search query 624. For example, the signal PRULE with the inventory search text may be sent to the LLM AI module 310. The LLM AI module 310 may determine the item being searched for in response to the inventory search query input 624. The rule module 304 may be configured to parse the inventory search query 624 and initiate a search of the item inventory 284.

The search result heading 626 may indicate to the end user that a search result has been provided in response to the inventory search query input 624. In response to searching the item inventory 284, the search result output 628 may be generated. In the example shown, the LLM AI module 310 may determine that the end user is searching for a hammer by analyzing the natural language input from the inventory search query input 624. The processor 102 may search the item inventory 284. For example, the item inventory 284 may comprise a description of the items (e.g., broad terms such as tools, narrow descriptions such as a hammer, a hockey stick, stacked wood, etc.) from the item descriptions 362. If there is a match between the natural language of the inventory search query input 624, and an item in the item inventory 284, the memory 150 may provide the signal ITEM.

The signal ITEM may comprise the item description and/or the item location. The LLM AI module 310 may be configured to generate a natural language answer for the item search. The rule module 304 may generate the signal ANS comprising the description of the item location. The signal ANS may be displayed as the search result output 628 on the user interface 302. In the example shown, the search result output 628 may be "The hammer is in the truck bed near the window". For example, the hammer 76*b* may have been located in the region 460*f* (e.g., the right side nearest the rear window 70, as shown in association with FIG. 11) using the computer vision operations. In some embodiments, along with the text description for the search result output 628 in the signal ANS, the associated video data 280 may be presented as the signal VIDOUT. For example, frame numbers 562 and/or the timestamps 564 comprising the last detection of the hammer in the inventory items 568 of the smart metadata 554*a*-554*n* may be transcoded using the video transcode module 306 and communicated in the signal VIDOUT along with the signal ANS in the signal NOTIFY sent to the user device 252.

Figure 15:
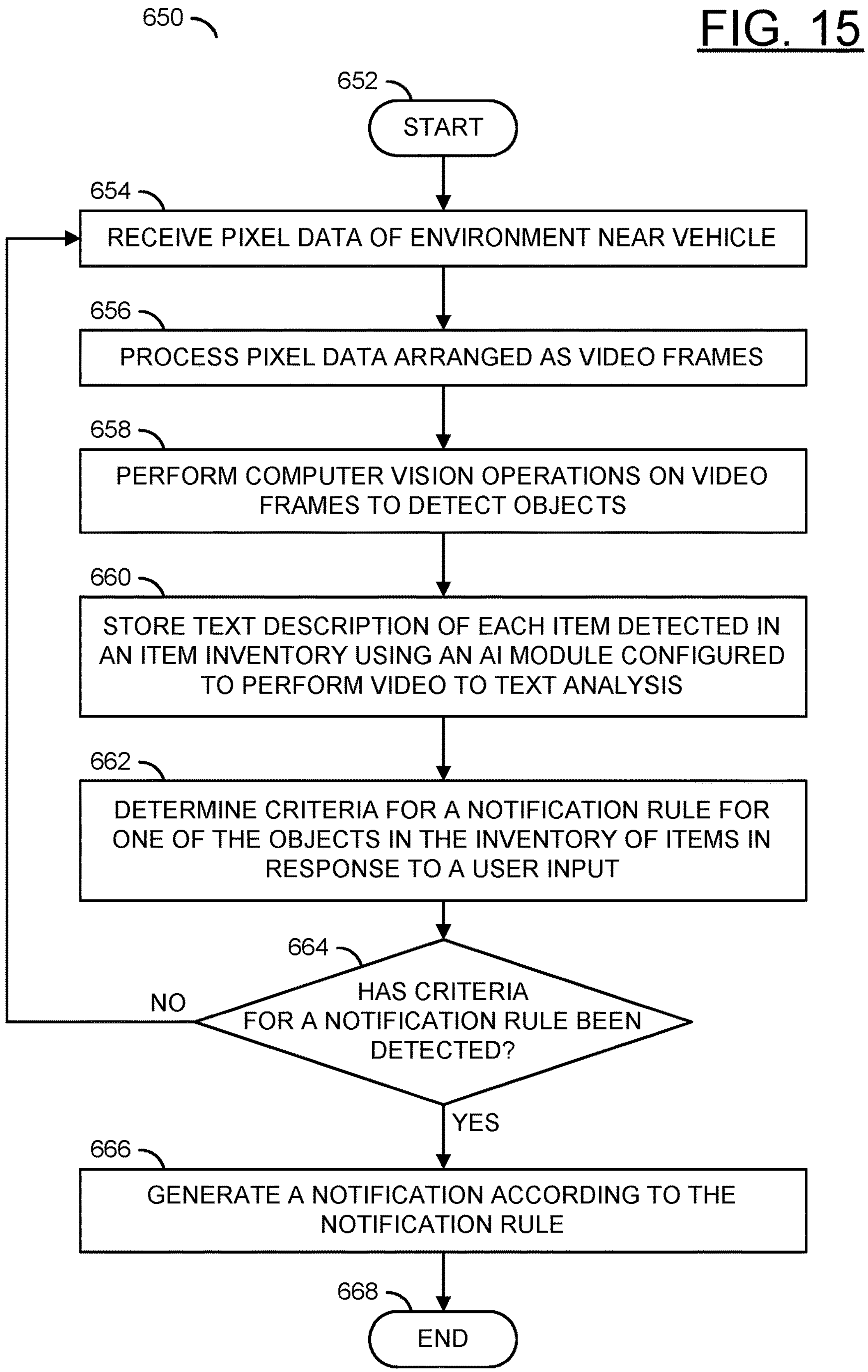
FIG. 15 is a flow diagram illustrating a method for implementing intelligent notifications for a truck bed camera enabled by smart metadata using image to text models.

Referring to FIG. 15, a method (or process) 650 is shown. The method 650 may implement intelligent notifications for a truck bed camera enabled by smart metadata using image to text models. The method 650 generally comprises a step (or state) 652, a step (or state) 654, a step (or state) 656, a step (or state) 658, a step (or state) 660, a step (or state) 662, a decision step (or state) 664, a step (or state) 666, and a step (or state) 668.

The step 652 may start the method 650. In the step 654, the processor 102 may receive the pixel data of the environment 40 near the vehicle 50. In an example, the capture device 104 may generate the pixel data in response to the light input signal LIN and generate the signal VIDEO comprising the pixel data. Next, in the step 656, the processor 102 may perform video processing operations using the video processing pipeline 260 to process the pixel data arranged as the video frames 552*a*-552*n*. In the step 658, the CNN module 190*b* and/or the AI module 270 may perform computer vision operations on the video frames to detect objects (e.g., the items 76*a*-76*n*). Next, the method 650 may move to the step 660.

In the step 660, the AI module 270 may perform the video-to-text analysis to describe the video contents, visual information and/or the context of the video frame(s) being analyzed. Each of the video frames 552*a*-552*n* may be individually analyzed and/or analyzed together by the AI module 270 in order to generate a human readable description of the human viewable information in the signal VDATA. Items detected as the objects from the step 658 may have the natural text description stored in the item inventory 284 in response to the video to text analysis. In the step 662, the processor 102 may determine criteria for a notification rule for one of the objects in the item inventory 284 in response to a user input. For example, the user may provide the signal PRULE from the user device 252. The LLM AI module 310 may determine the criteria for the notification rule, and the signal NOTR may be presented to the memory 150 to store the notification rule in the notification criteria 286. Next, the method 650 may move to the decision step 664.

In the decision step 664, the processor 102 may determine whether the criteria for one of the notification rules 620*a*-620*n* has been detected. In some embodiments, the CNN module 190*b* implemented by the processor 102 may perform computer vision operations on the incoming input video frames to search for the criteria of the notification rules. For example, the notification criteria 286 may comprise a feature set for performing computer vision operations. In some embodiments, the notification rule AI model 274 may compare the smart metadata 554*a*-554*n* for the video frames 552*a*-552*n* to the text description of the notification criteria 286. If the criteria for the notification rule has not been detected, then the method 650 may return to the step 654. If the criteria for the notification rule has been detected, then the method 650 may move to the step 666. In the step 666, the processor 102 may generate the notification according to the notification rule. For example, the communication interface 254 may present the signal NOTIFY to the user device 252. Next, the method 650 may move to the step 668. The step 668 may end the method 650.

Figure 16:
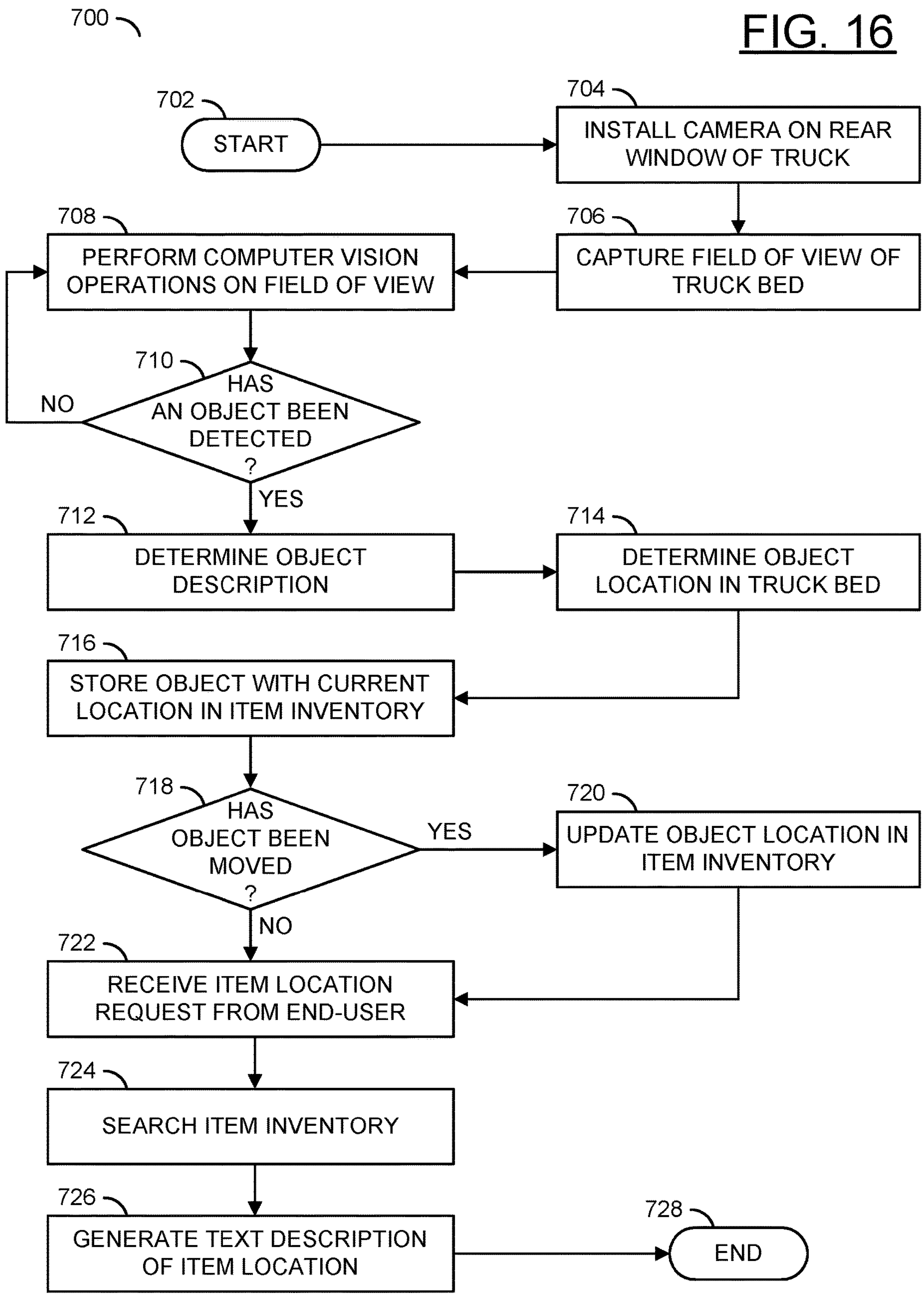
FIG. 16 is a flow diagram illustrating a method for generating an item inventory for an environment.

Referring to FIG. 16, a method (or process) 700 is shown. The method 700 may generate an item inventory for an environment. The method 700 generally comprises a step (or state) 702, a step (or state) 704, a step (or state) 706, a step (or state) 708, a decision step (or state) 710, a step (or state) 712, a step (or state) 714, a step (or state) 716, a decision step (or state) 718, a step (or state) 720, a step (or state) 722, a step (or state) 724, a step (or state) 726, and a step (or state) 728.

The step 702 may start the method 700. In the step 704, the owner of the vehicle 50 may install the camera system 100 on the rear window 70 of the vehicle 50 (e.g., the truck rear window as shown in association with FIG. 4). Next, in the step 706, the camera system 100 may capture the field of view 62 of the truck bed 72. In the step 708, the processor

102 may perform computer vision operations on the video frames of the field of view 62. Next, the method 700 may move to the decision step 710.

In the decision step 710, the processor 102 may determine whether an object has been detected. In some embodiments, the processor 102 may use the external item database 354 to receive information about items detected (e.g., upload the signal VDATA to the item database 354 and receive the signal ITEMID). If no object has been detected, then the method 700 may return to the step 708. If an object has been detected, then the method 700 may move to the step 712. In the step 712, the AI module 270 may determine the description of the object. In one example, the description may be provided by the item descriptions 362 of the external item database 354. In another example, the description may be generated by the video-to-text AI model 272. Next, in the step 714, the AI module 270 may determine the object location in the truck bed 72. For example, the item may be located in one of the regions 460*a*-460*f*. In the step 716, processor 102 may store the object with the current location in the item inventory 284. Next, the method 700 may move to the decision step 718.

In the decision step 718, the processor 102 may determine whether the object has moved. In an example, the processor 102 may be configured to track the movement of the items 76*a*-76*n* over time in the video frames 552*a*-552*n*. If the object has moved, then the method 700 may move to the step 720. In the step 720, the processor 102 may update the location of the object in the item inventory 284 (e.g., change to a different one of the regions 460*a*-460*f*). Next, the method 700 may move to the step 722. In the decision step 718, if the object has not moved then the method 700 may move to the step 722.

In the step 722, the user interface 302 may receive the item location request input 624 from the end user on the user device 252. Next, in the step 724, the processor 102 may search the item inventory 284. For example, the LLM AI module 310 may parse the item location request input 624 to determine the item being searched for and compare the determined item with the item descriptions in the item database 284. In the step 726, the user interface 302 may generate the text description of the item location (e.g., the search request output 628). For example, the processor 102 may generate the signal ANS, and the communication interface 254 may present the signal NOTIFY to the user device 252. Next, the method 700 may move to the step 728. The step 728 may end the method 700.

Figure 17:
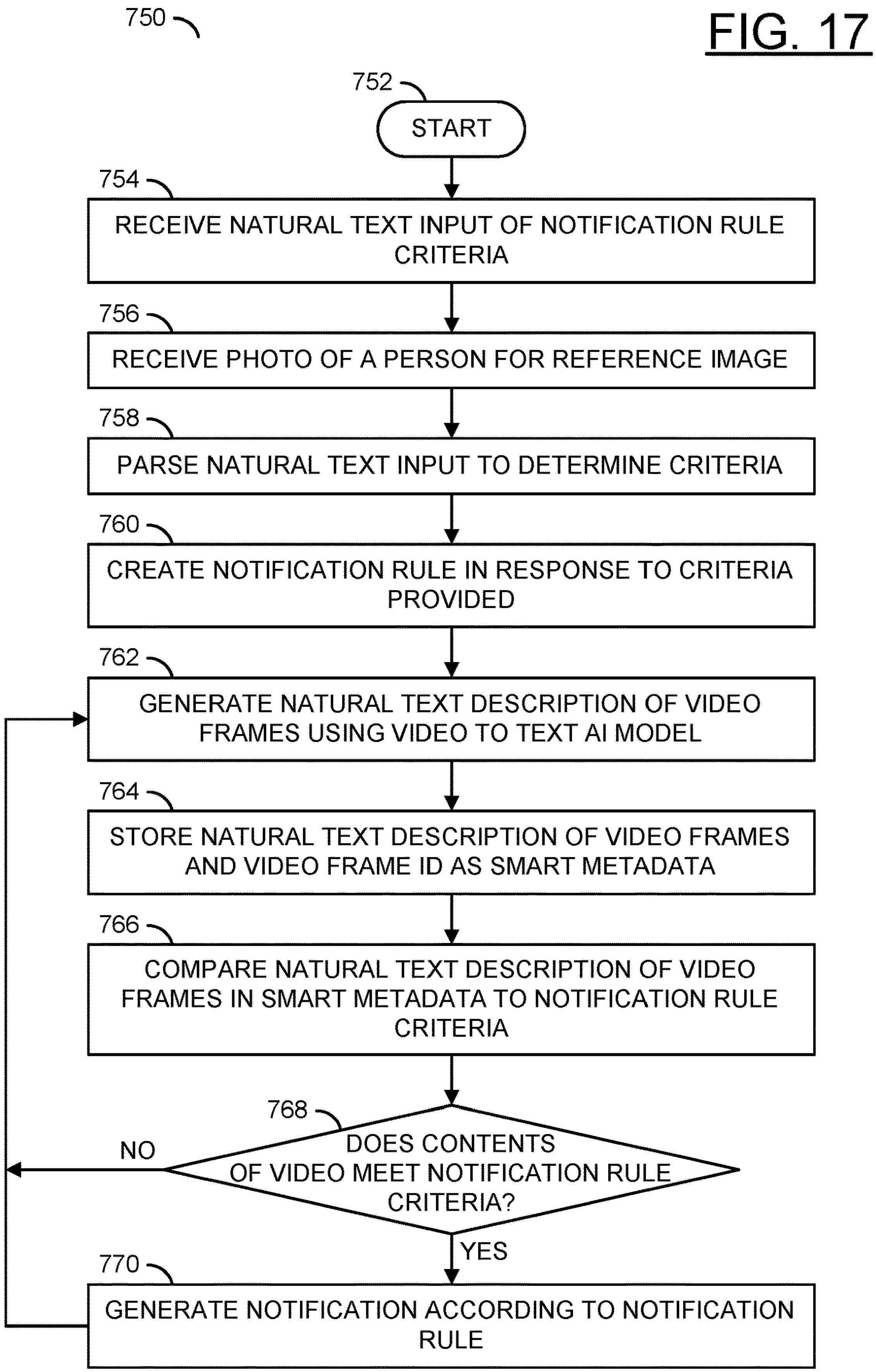
FIG. 17 is a flow diagram illustrating a method for using natural text descriptions to create and detect criteria for a notification rule.

Referring to FIG. 17, a method (or process) 750 is shown. The method 750 may use natural text descriptions to create and detect criteria for a notification rule. The method 750 generally comprises a step (or state) 752, a step (or state) 754, a step (or state) 756, a step (or state) 758, a step (or state) 760, a step (or state) 762, a step (or state) 764, a step (or state) 766, a decision step (or state) 768, and a step (or state) 770.

The step 752 may start the method 750. In the step 754, the LLM AI module 310 may receive a natural text input of the notification rule criteria. For example, the end user may write a natural text description for the notification rule on the user device 252 and the natural text may be communicated via the signal PRULE. Next, in the step 756, the processor 102 may receive a photo of a person for a reference image. The reference image may be used to perform facial detection and/or facial recognition as part of the computer vision operations. Using facial recognition may enable the notification rules to comprise criteria for specific people. In the step 758, the LLM AI module 310 may parse the natural text to determine the criteria. Next, in the step 760, the criteria module 312 may create a notification rule in response to the criteria provided by the end user. For example, the signal NOTR may be presented to the memory 150 and stored as part of the notification criteria 286. Next, the method 750 may move to the step 762.

In the step 762, video-to-text AI model 272 may generate a natural text description of the video frames 552*a*-552*n*. The natural text description may be a human readable description of the contents of the video frames 552*a*-552*n*. In one example, the natural text description of the video frames 552*a*-552*n* may provide a description that may be used by the visually impaired to understand the contents of the video frames (e.g., using a screen reader). Next, in the step 764, the natural text description 566 of the video frames 552*a*-552*n* may be stored as the smart metadata 554*a*-554*n* in the text metadata 282. In the step 766 the notification rule AI model 274 may compare the natural text description 566 of the video data 280 stored in the text metadata 282 to the notification criteria 286. For example, the notification rule AI model 274 may compare the text of the notification criteria 286 to the text of the natural video text description 566. Next, the method 750 may move to the decision step 768.

In the decision step 768, the notification rule AI model 274 may determine whether the contents of the video frames 552*a*-552*n* meet the criteria of the notification rules 620*a*-620*n*. If the contents of the video does not meet the notification rule criteria, then the method 750 may return to the step 762. If the contents of the video does meet the notification rule criteria, then the method 750 may move to the step 770. In the step 770, the processor 102 may generate the notification according to the notification rule. For example, the natural text description of the criteria provided by the end user when submitting the notification rule may comprise information about how to provide the notification (e.g., a text message, a push notification, an audio alert, send a video, etc.). The type of notification may be determined by the LLM AI module 310. Next, the method 750 may return to the step 762.

Figure 18:
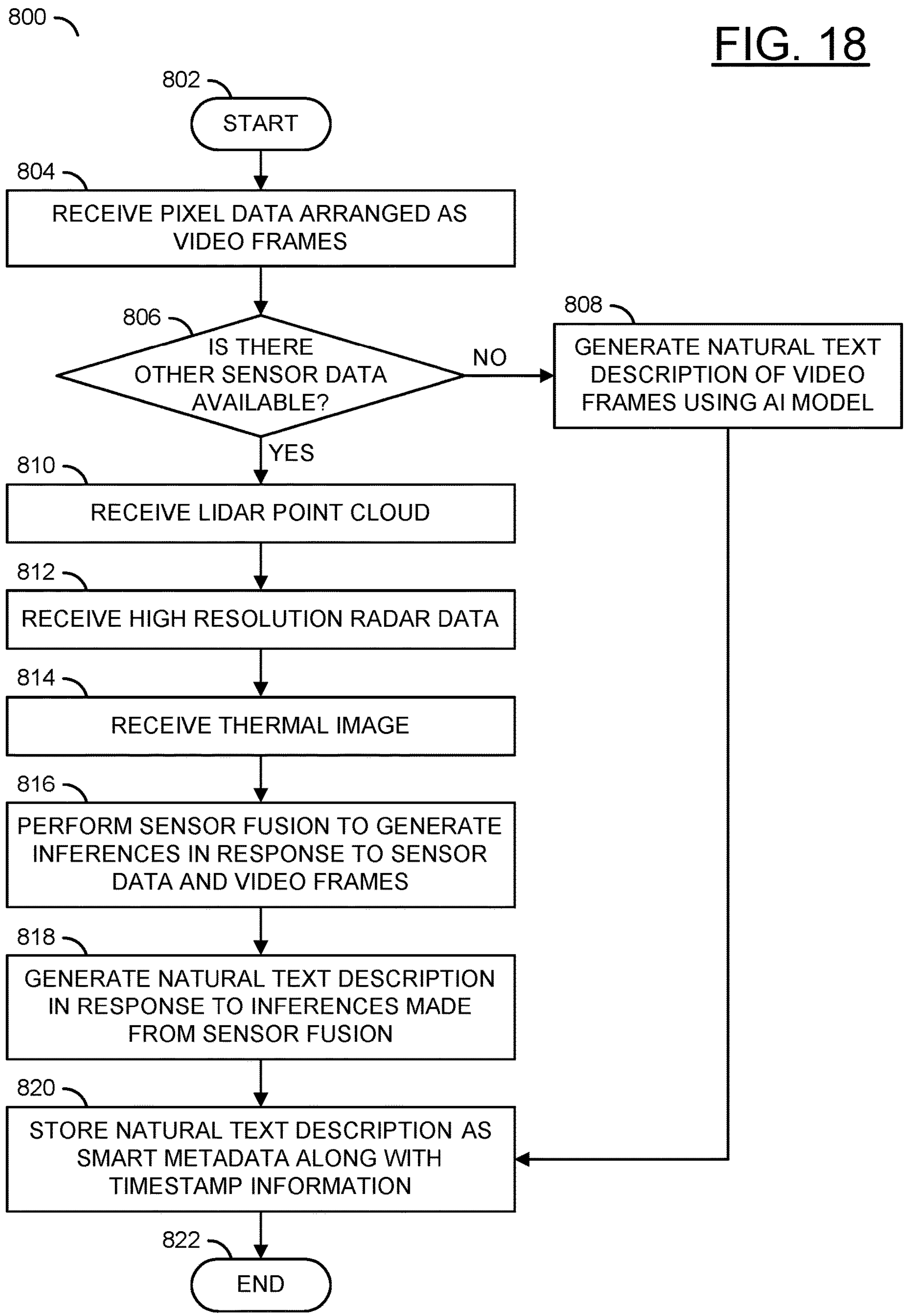
FIG. 18 is a flow diagram illustrating a method for using sensor fusion to generate smart metadata.

Referring to FIG. 18, a method (or process) 800 is shown. The method 800 may use sensor fusion to generate smart metadata. The method 800 generally comprises a step (or state) 802, a step (or state) 804, a decision step (or state) 806, a step (or state) 808, a step (or state) 810, a step (or state) 812, a step (or state) 814, a step (or state) 816, a step (or state) 818, a step (or state) 820, and a step (or state) 822.

The step 802 may start the method 800. In the step 804, the processor 102 may receive the pixel data arranged as video frames. Next, in the decision step 806, the processor 102 may determine whether there is other sensor data available. For example, if the processor 102 implements, or has access to the sensor fusion module 190*c*, then the processor 102 may be capable of combining the video data with the other sensor data for additional context. If there is no other sensor data available, then the method 800 may move to the step 808. In the step 808, the video-to-text AI model 272 may generate the natural text description 566 of the video frames 552*a*-552*n*. Next, the method 800 may move to the step 820. In the decision step 806, if there is other sensor data available, then the method 800 may move to the step 810.

The steps 810-814 may provide example types of other sensor data that may be received. Other types of sensor data not specifically enumerated (e.g., data from the CAN bus of the vehicle 50, data from an inertial measurement unit, a microphone, etc.) may also be used similar to the sensor data in the steps 810-814. In the step 810, the sensor fusion module 190*c* may receive a point cloud from the lidar 188*a*. In the step 812, the sensor fusion module 190*c* may receive high resolution radar data from the radar 188*b*. In the step 814, the sensor fusion module 190*c* may receive a thermal image from the thermal camera 188*n*. Next, in the step 816, the sensor fusion module 190*c* may perform sensor fusion operations to generate inferences from the combination (e.g., multiple factor analysis) of the sensor data and the video frames 552*a*-552*n*. In the step 818, the video-to-text AI model 272 may generate the natural text description 566 in response to the inferences made from the sensor fusion operations. Next, the method 800 may move to the step 820.

In the step 820, the natural text description 566 may be stored as the smart metadata 282 along with timestamp information. For example, the sensor fusion module 190*c* may be configured to perform the multiple factor analysis using the timestamps 564 of the video frames 552*a*-552*n* and the timestamp of the sensor data to ensure the data is temporally associated. Next, the method 800 may move to the step 822. The step 822 may end the method 800.

The functions performed by the diagrams of FIGS. 1-18 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive pixel data of an environment near a vehicle; and a processor configured to (i) process said pixel data arranged as video frames, (ii) perform a video to text analysis on said video frames to generate a text description of said video frames comprising plain language that fully describes visual content captured in said video frames, (iii) generate an inventory of items comprising each object described in said environment from said text description, (iv) determine criteria for a notification rule for one of said objects of said inventory of items in response to a user input, (v) compare said text description of said video frames to said criteria for said notification rule to determine whether said criteria for said notification rule for said one of said objects has been met, and (vi) generate a notification according to said notification rule in response to detecting that said criteria has been met, wherein said processor comprises an Artificial Intelligence (AI) module configured to (a) perform said video to text analysis of said video frames to generate said text description of said video frames comprising said plain language that fully describes said visual content of said video frames and (b) determine said notification rule in response to a conversational interaction for receiving said user input.

2. The apparatus according to claim 1, wherein (i) a camera is installed on a rear window of said vehicle, (ii) said environment comprises a truck bed of said vehicle, and (iii) said camera is configured to capture said pixel data of said truck bed through said rear window of said vehicle.

3. The apparatus according to claim 2, wherein said inventory of items corresponds to said objects in said truck bed.

4. The apparatus according to claim 2, wherein (i) said camera comprises an adhesive on a side of said camera with a lens and (ii) said adhesive enables said camera to be installed on said rear window.

5. The apparatus according to claim 2, wherein said criteria for said notification rule comprises at least one of (i) detecting that said one of said objects is not in said truck bed and (ii) detecting that anyone has touched said one of said objects in said truck bed.

6. The apparatus according to claim 2, wherein said text description of each of said objects comprises an identification of said objects and a location of said objects in said truck bed.

7. The apparatus according to claim 6, wherein said location of said objects in said truck bed is updated as said objects change said location in said truck bed over time.

8. The apparatus according to claim 1, wherein (i) a camera is integrated as part of said vehicle, and (ii) said camera is configured to capture said pixel data of said environment near said vehicle when said vehicle is parked.

9. The apparatus according to claim 8, wherein said camera is a backup camera of said vehicle.

10. The apparatus according to claim 1, wherein (i) said video to text analysis is configured to perform facial recognition operations to identify a person and (ii) said notification rule comprises one or more approved people for accessing said one of said objects.

11. The apparatus according to claim 10, wherein (i) an app for a smartphone is implemented to enable receiving said user input and presenting said notification, and (ii) said app is configured to receive photos captured by a camera of said smartphone to use as reference images for said facial recognition operations.

12. The apparatus according to claim 1, wherein said user input comprises a natural language text description for said notification rule and said AI module is a large language model configured to determine said criteria for said notification rule in response to said natural language text description.

13. The apparatus according to claim 1, wherein said inventory of items correspond to supplies for a tailgate party.

14. The apparatus according to claim 1, wherein (i) a remote server is configured to store a database of items, (ii) said database of items comprises (a) reference images for said inventory of items and (b) an item description of said inventory of items, and (iii) said apparatus is further configured to communicate with said remote server to compare said objects detected to said database of items to determine said inventory of items.

15. The apparatus according to claim 1, wherein said AI module comprises (i) a first AI model configured to perform said video to text analysis of said video frames to generate said text description of said objects in said environment and (ii) a second AI model configured to determine said notification rule in response to said user input.

16. The apparatus according to claim 15, wherein a third AI model is configured to compare said criteria with said text description to determine whether to generate said notification.

17. The apparatus according to claim 16, wherein (i) said text description is stored as smart metadata generated by a transformer network implemented by said AI module, (ii) said smart metadata comprises a natural language text description of said video frames and (iii) said third AI model is configured to compare said criteria to said natural language text description of said video frames.

18. The apparatus according to claim 1, further comprising a sensor fusion module, wherein (i) said interface is further configured to receive data from one or more sensors of said vehicle, (ii) said sensor fusion module is configured to (a) receive said data and (b) make inferences in response to an analysis of said data and said video frames, and (iii) said AI module is configured to generate said text description in response to said inferences.

19. The apparatus according to claim 18, wherein said sensors comprise one or more of (i) a lidar, (ii) a high resolution radar, and (iii) a thermal camera.

20. The apparatus according to claim 1, wherein said processor is further configured to (i) perform computer vision operations on said video frames to detect said objects in said environment, (ii) generate a frame number in response to a detection threshold for said objects, (iii) extract a subset of said video frames in response to said frame number, (iv) present said subset of said video frames to said AI module and (v) perform said video to text analysis on said subset of said video frames after said computer vision operations are performed.

* * * * *